(12) United States Patent
Blevins

(10) Patent No.: US 11,274,773 B1
(45) Date of Patent: Mar. 15, 2022

(54) POLE ROLLER

(71) Applicant: Barry I. Blevins, Pacific Grove, CA (US)

(72) Inventor: Barry I. Blevins, Pacific Grove, CA (US)

( * ) Notice: Subject to any disclaimer, the term of this patent is extended or adjusted under 35 U.S.C. 154(b) by 49 days.

(21) Appl. No.: 16/988,677

(22) Filed: Aug. 9, 2020

Related U.S. Application Data

(63) Continuation-in-part of application No. 16/432,878, filed on Jun. 5, 2019, now abandoned, which is a continuation-in-part of application No. 15/834,012, filed on Dec. 6, 2017, now abandoned.

(60) Provisional application No. 62/434,120, filed on Dec. 14, 2016.

(51) Int. Cl.
*F16L 3/18* (2006.01)

(52) U.S. Cl.
CPC ..................... *F16L 3/18* (2013.01)

(58) Field of Classification Search
CPC .... F16L 3/012; F16L 7/00; F16L 3/18; B65H 57/02; B65H 57/04; B65H 57/14; B65H 57/26; F16M 11/22; F16M 2200/08; H02G 1/08; H02G 1/088; H02G 1/086; B08B 9/04; E03F 9/00; A01G 25/00
USPC .......... 248/87, 80–86, 88; 242/615.2, 615.3; 254/134.3 FT, 134.3 R, 134.4
See application file for complete search history.

(56) References Cited

U.S. PATENT DOCUMENTS

| | | | | |
|---|---|---|---|---|
| 1,735,301 A | * | 11/1929 | Short | H02G 1/08 254/134.3 FT |
| 1,831,306 A | * | 11/1931 | Kakimoto | A01G 25/00 242/615.2 |
| 1,865,113 A | * | 6/1932 | Kiesel | H02G 1/08 254/134.3 R |
| 2,264,751 A | * | 12/1941 | Maxtone-Graham | A01G 25/00 242/615.2 |
| 2,501,407 A | * | 3/1950 | Olsen | A01G 25/00 242/615.2 |
| 2,618,465 A | * | 11/1952 | Austin, Jr. | B65H 57/14 242/615.2 |
| 2,629,768 A | * | 2/1953 | Beil | H02G 1/08 254/134.3 R |
| 2,846,189 A | * | 8/1958 | MacLaughlin | A01G 25/00 242/615.2 |
| 2,974,933 A | * | 3/1961 | Belanger | A01G 25/00 242/615 |
| 3,081,978 A | * | 3/1963 | Kaufmann | A01G 25/00 242/615.2 |

(Continued)

*Primary Examiner* — Ingrid M Weinhold

(57) ABSTRACT

A pole roller configured to prevent a hose from contacting a side surface point of entry in a pipeline or an obstacle. The pole roller includes a roller having an axis, a shaft opening and a pair of end walls, wherein the end walls include a top and bottom bearing end wall. Said roller, being rotatable about a stationary axle disposed at the axis of the roller. The shaft opening can include an optional crush sleeve disposed between a pair of roller bearings, the roller bearings being disposed at the top and bottom end walls respectively. A base frame having at least one pull-line finger, a protection wear ring and a plurality of base support feet, the pull-line fingers and the base support feet mounted to the protection wear ring. A pole attachment member mounted to the stationary axle for allowing an elongated pole to be attach thereon.

20 Claims, 28 Drawing Sheets

(56) References Cited

U.S. PATENT DOCUMENTS

| | | | | |
|---|---|---|---|---|
| 3,249,337 A * | 5/1966 | Neumann | B66D 1/7421 | 242/615.2 |
| 3,416,484 A * | 12/1968 | Chapman | E01F 15/141 | 116/67 R |
| D215,952 S * | 11/1969 | Michaels | D8/356 | |
| D218,177 S * | 7/1970 | Rogers | D8/356 | |
| 3,522,815 A * | 8/1970 | Prange | B65H 75/4402 | 134/167 R |
| 3,829,065 A * | 8/1974 | Less | A01G 25/00 | 242/615.2 |
| 4,228,990 A * | 10/1980 | Horvath | B08B 9/0433 | 15/104.33 |
| 4,452,386 A * | 6/1984 | McElyea | B65H 57/14 | 242/157 R |
| 5,549,262 A * | 8/1996 | Whitehead | A01G 25/00 | 239/276 |
| 5,580,589 A * | 12/1996 | Stoves | B29C 53/083 | 405/154.1 |
| D404,981 S * | 2/1999 | Wu | D8/1 | |
| 6,332,595 B1 * | 12/2001 | Klucznik | F16L 1/0246 | 248/80 |
| 6,394,701 B1 * | 5/2002 | Delaforce | F16L 55/18 | 138/97 |
| 6,502,791 B2 * | 1/2003 | Parker | F16L 3/18 | 248/405 |
| 6,554,540 B1 * | 4/2003 | Corsan | B65H 57/14 | 226/180 |
| 7,426,843 B2 * | 9/2008 | Ulrich | B29C 48/92 | 72/6.2 |
| 7,527,227 B1 * | 5/2009 | Mondello | A62C 33/00 | 242/615.2 |
| 7,862,257 B2 * | 1/2011 | Jeong | F16L 3/012 | 405/184.4 |
| 8,122,913 B2 * | 2/2012 | Stark | F16L 57/06 | 138/110 |
| 8,434,740 B2 * | 5/2013 | Logtenberg | H02G 9/06 | 254/134.3 FT |
| 8,561,951 B2 * | 10/2013 | Wills | A01G 25/00 | 248/76 |
| 2001/0028021 A1 * | 10/2001 | Martin | B65H 57/14 | 248/87 |
| 2004/0232276 A1 * | 11/2004 | Ferris | B65H 57/14 | 242/615.1 |
| 2006/0180426 A1 * | 8/2006 | Scott | B65G 39/02 | 193/37 |
| 2008/0101869 A1 * | 5/2008 | Jeong | H02G 9/10 | 405/174 |
| 2012/0168572 A1 * | 7/2012 | Wills | F16L 3/18 | 248/71 |

* cited by examiner

POLE ROLLER

CROSS-REFERENCE TO RELATED DOCUMENTS

This application is a continuation-in-part of pending non-provisional U.S. patent application Ser. No. 16/432,878, entitled "Pole Roller", filed on Jun. 5, 2019, which claims priority to non-provisional U.S. patent application Ser. No. 15/834,012, entitled "Pole Roller", filed on Dec. 6, 2017, which claims priority to U.S. provisional patent application 62/434,120, entitled "Pole Roller", filed on Dec. 14, 2016. This application incorporates the disclosures of all applications mentioned in this paragraph by reference as if fully set forth herein.

FIELD OF THE INVENTION

The present invention relates to an apparatus for aiding a hose and nozzle as it advances forward in a pipeline, and more particularly, to a pole roller apparatus for aiding a sewer hose and a high-pressure nozzle as it advances forward on the bottom and side surface of a pipeline.

DISCUSSION OF THE STATE OF THE PRIOR ART

A mobile truck (e.g., hydro cleaner, also known as a jet truck) and sewer cleaning machines are commonly used by municipalities and others for cleaning wastewater collection system lines (sewer lines) using a sewer hose attached to a nozzle that includes a plurality of jet holes for delivering high pressure water. Such flushing and cleaning are periodically necessary to cut away roots and to remove accumulated sludge, debris and sediment. The sewer hose is inserted into the sewer line typically at a downstream manhole. Once inserted, the sewer hose is generally propelled up-stream through the sewer line by highly pressurized water expelled or discharged from the nozzle. The debris and sediment dislodged by the pressurized water is washed downstream and collects in the downstream manhole.

The hydro cleaning truck also includes a pumping mechanism connected to a fluid supply for delivering water under pressure through one or more sewer hoses wound on a reel. The hose may be wound onto or unwound from the reel to thread the hose into or withdraw it from the sewer line. The length of the hose is typically a hundred feet or more, and as previously mentioned, is propelled up-stream through the sewer pipeline by highly pressurized water discharged from the nozzle. As the hose is propelled forward through the sewer pipeline, it takes more energy to continuously advance it forward because of various factors such as friction or drag between the hose and the surface of the sewer pipeline, the weight and length of the hose, gravity and the incline or grade of the sewer pipeline.

Often times, the sewer lines under an area form a lattice or grid-like pattern. Traditionally, an operator and crew set up their cleaning equipment on a manhole in the street and then run their hose up the line linearly to clean a desired area. If it is possible for the operator and crew to drive to the next manhole where the pipeline turns at an angle, they typically set up there and continue cleaning the sewer pipeline. However, if the next manhole is located in an easement, which is often the case and is usually not accessible by a vehicle, and a portion of the sewer pipeline veers off at an angle, the operator and crew will need to turn the nozzle and hose into the sewer line at the next manhole to allow the cleaning process to continue. To facilitate the turning of the nozzle and hose into the sewer pipeline at the next manhole, a pole roller can advantageously be used.

In use, current pole rollers are at a distinct disadvantage when compared to the present invention. For instance, current prior art pole rollers typically end up having their rollers hit and/or rub against the side surface of sewer pipelines that veer off at an angle since they do not include a protection wear ring causing the roller to break and the hose to advance forward at a shorter distance in the sewer pipeline due to the increased surface friction and/or drag. The increased surface friction and/or drag also causes the hose to wear down much faster.

In light of the shortcomings in the prior art, there clearly exists a need for an improved pole roller that allows a sewer hose and nozzle to continuously advance forward with less friction and/or drag on the side surface of a sewer pipeline that veers off at an angle.

SUMMARY OF THE INVENTION

The present invention relates to a new pole roller assembly designed to simplify the cleaning of wastewater collection system lines (sewer lines) with manhole access points located in remote areas that include sewer pipelines that veer off at various angles.

The present invention also provides a pole roller assembly constructed so as to be light weight, compact, easily stored in any position on a jet truck, and then easily removed and taken to a desired location to help clean a sewer pipeline that veers off at an angle.

Another aspect of the present invention is to provide a low cost, high efficiency pole roller that allows sewer lines to be cleaned quickly while helping to conserve water since the hose and nozzle moves more efficiently in sewer lines that veer of at various angles.

A further aspect of the current invention is to provide a pole roller apparatus that is more compact and durable for cleaning sewer pipelines of limited dimensional space.

The present invention also provides a pole roller suitably designed to enable wastewater collection system operators to get their job done smarter, safer and faster. For example, the pole roller allows for less water pressure to be needed since the hose and nozzle can move more efficiently in sewer lines that veer of at various angles. Also, using lower water pressure in a high-pressure nozzle helps to avoid bubbling in toilets and is less dangerous to users when in use.

Consequently, for a better understanding of the present invention, its functional advantages and the specific objects attained by its uses, reference should be made to the accompanying drawings, claims and descriptive matter in which there are illustrated preferred embodiments of the invention.

DETAILED DESCRIPTION OF THE INVENTION

The following detailed description is of the best currently contemplated modes of carrying out various embodiments of the invention. The description is not to be taken in a limiting sense but is made for at least the purpose of illustrating the general principles of the invention, since the scope of the invention is best defined by the appended claims.

In one embodiment, the present invention provides a pole roller assembly used for assisting a hose and a high-pressure nozzle to continuously advance forward in a pipeline that veers off at an angle. The pressure generated by the nozzle can be in the range of 500 psi to 4,000 psi. The pole roller assembly includes a roller having a circular shaft opening and a pair of circular end walls. The end walls include a top bearing end wall and a bottom bearing end wall. The shaft opening is configured to house an optional crush sleeve disposed between a pair of roller bearings. The use of an optional crush sleeve will depend upon the roller manufactured material. The roller bearings are housed/secured at the top and bottom end walls respectively. The outer sections of the bearings are configured to rotate with the roller and the inner section of the bearings remain stationary and are fixedly connected to a bolt that acts as a stationary axle. A base frame will have at least one pull-line finger, a protection wear ring and a plurality of base support feet. The pull-line fingers and the base support feet are fixedly mounted to the protection wear ring. The protection wear ring has an inner connector hole disposed within the outer radius of the wear ring.

A pole attachment member is fixedly mounted to a bolt. The bolt forms the stationary axle and has a head and opposite end having a first pin hole. The head is fixedly coupled to the inner connector hole to form the stationary axle. The base frame is configured to rest horizontally on the bottom surface of a pipeline while the roller and pole attachment member are positioned vertical with respect to the base frame, thereby enabling the roller to spin when the hose engages thereon. In addition, the pole attachment member remains stationary (i.e., does not spin) while a pole is attached to the opposite end of the bolt as a user holds the pole during use.

Figure 1A:
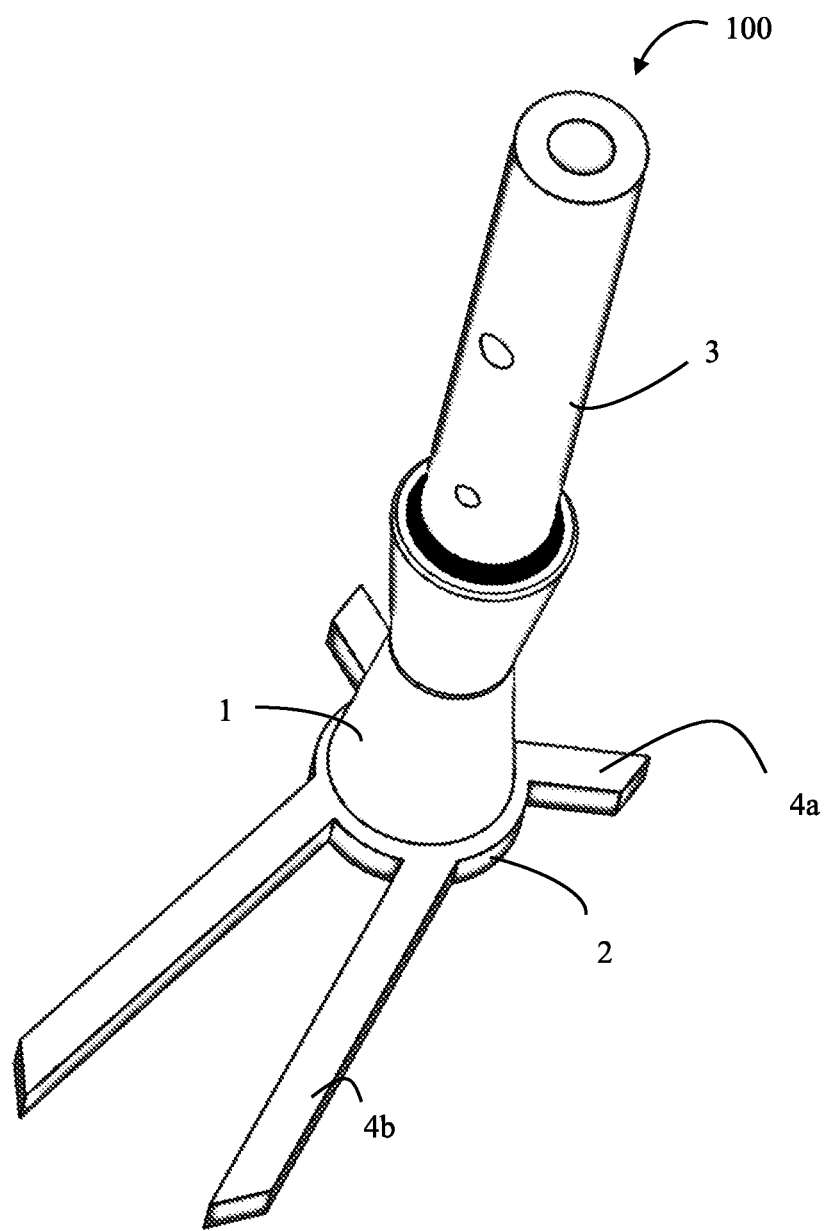
FIG. 1A is front perspective views of the pole roller 100.
Figure 1B:
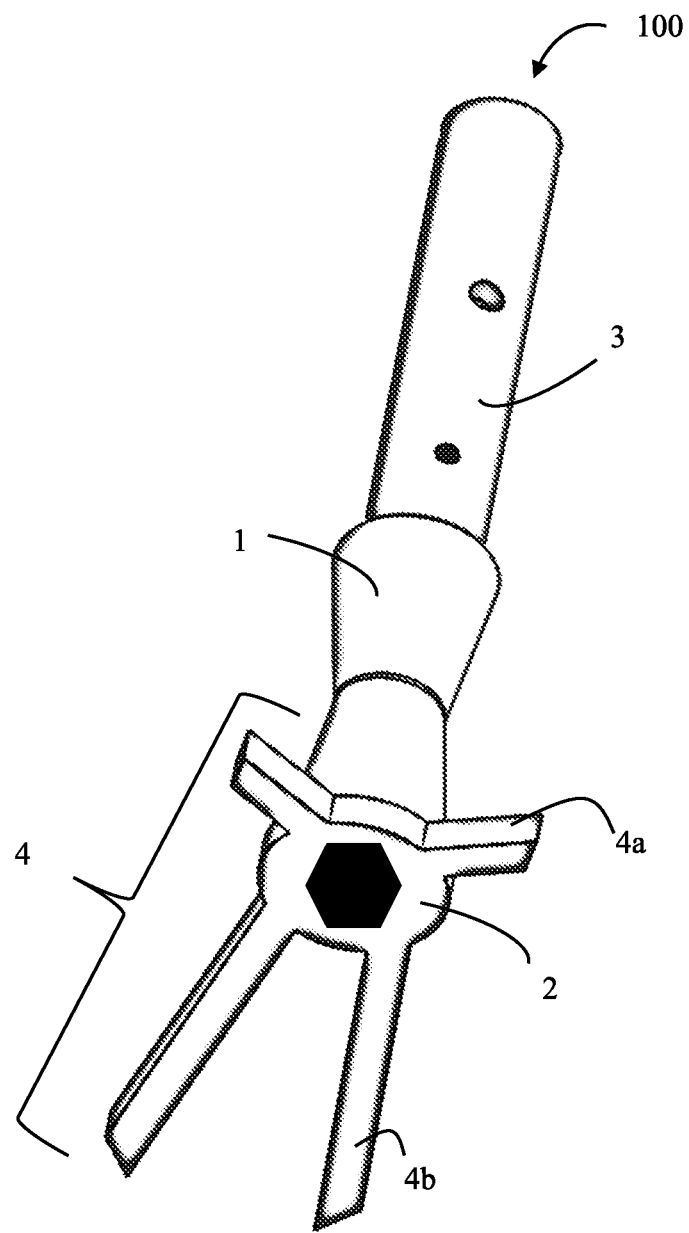
FIG. 1B is partial perspective view showing the bottom of the pole roller 100.
Figure 1C:
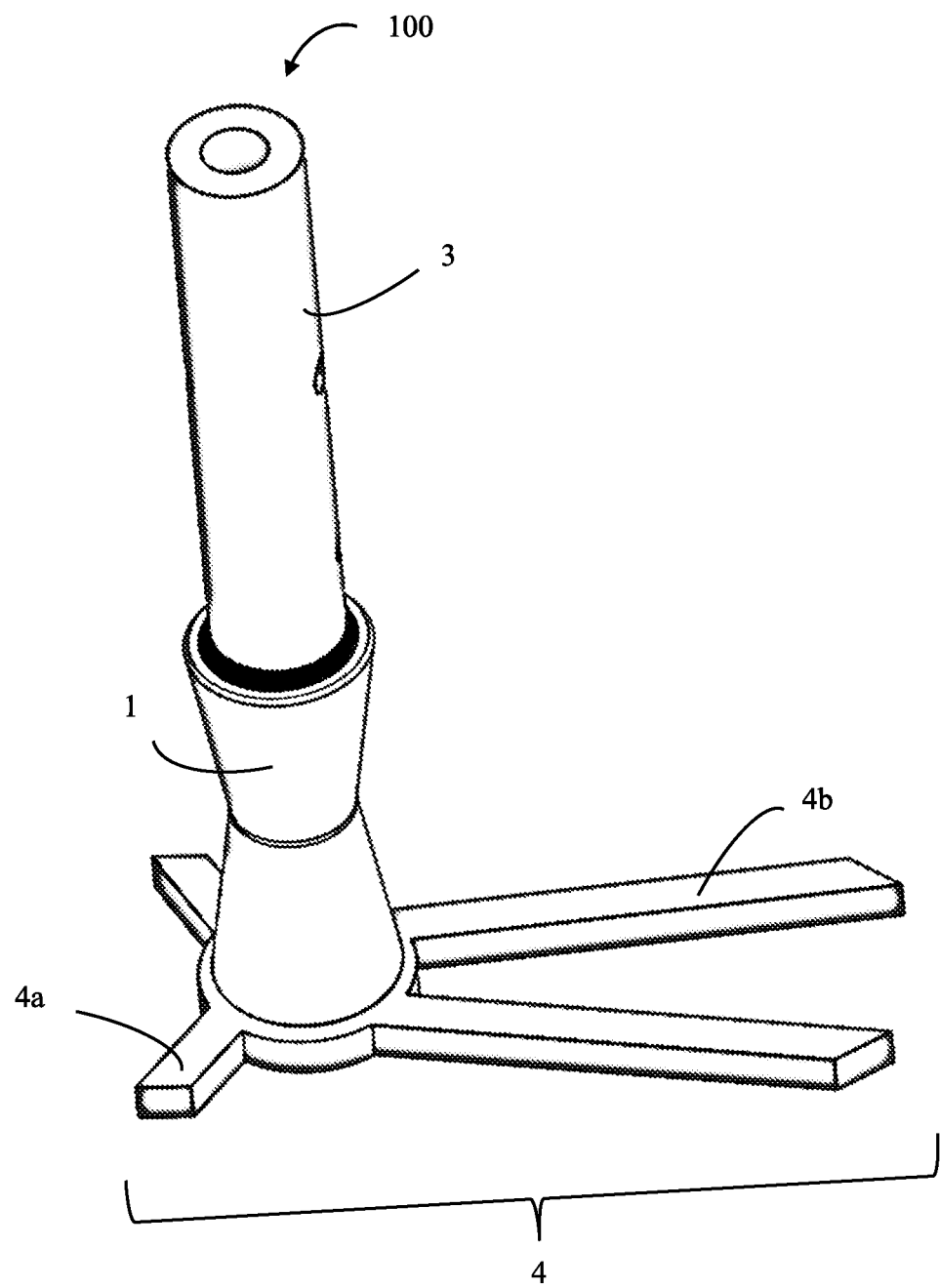
FIG. 1C is side perspective views of the pole roller 100.
Figure 3A:
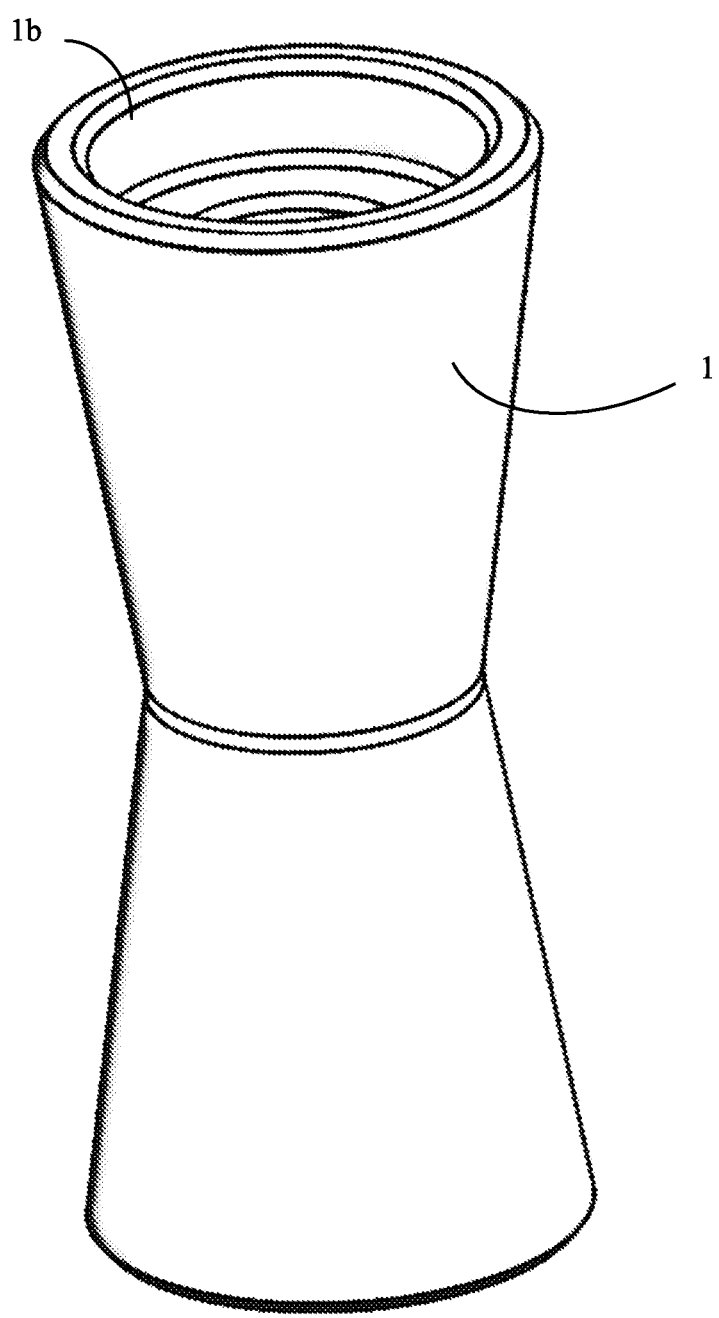
FIG. 3A is a perspective view of the roller 1.
Figure 3B:
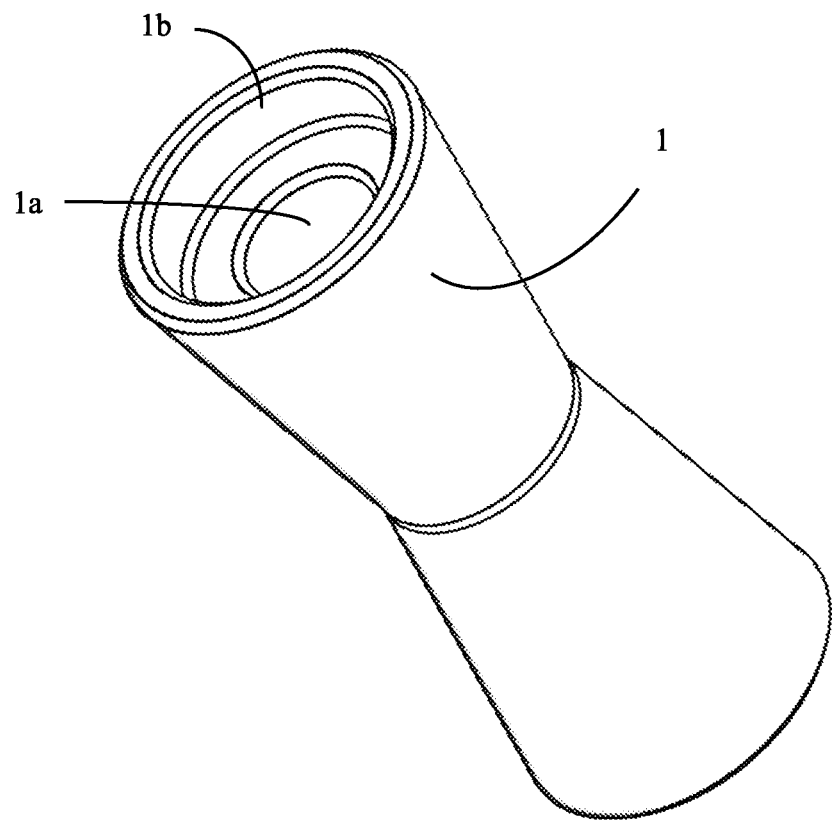
FIG. 3B is a partial perspective view showing the top of the roller 1.
Figure 3C:
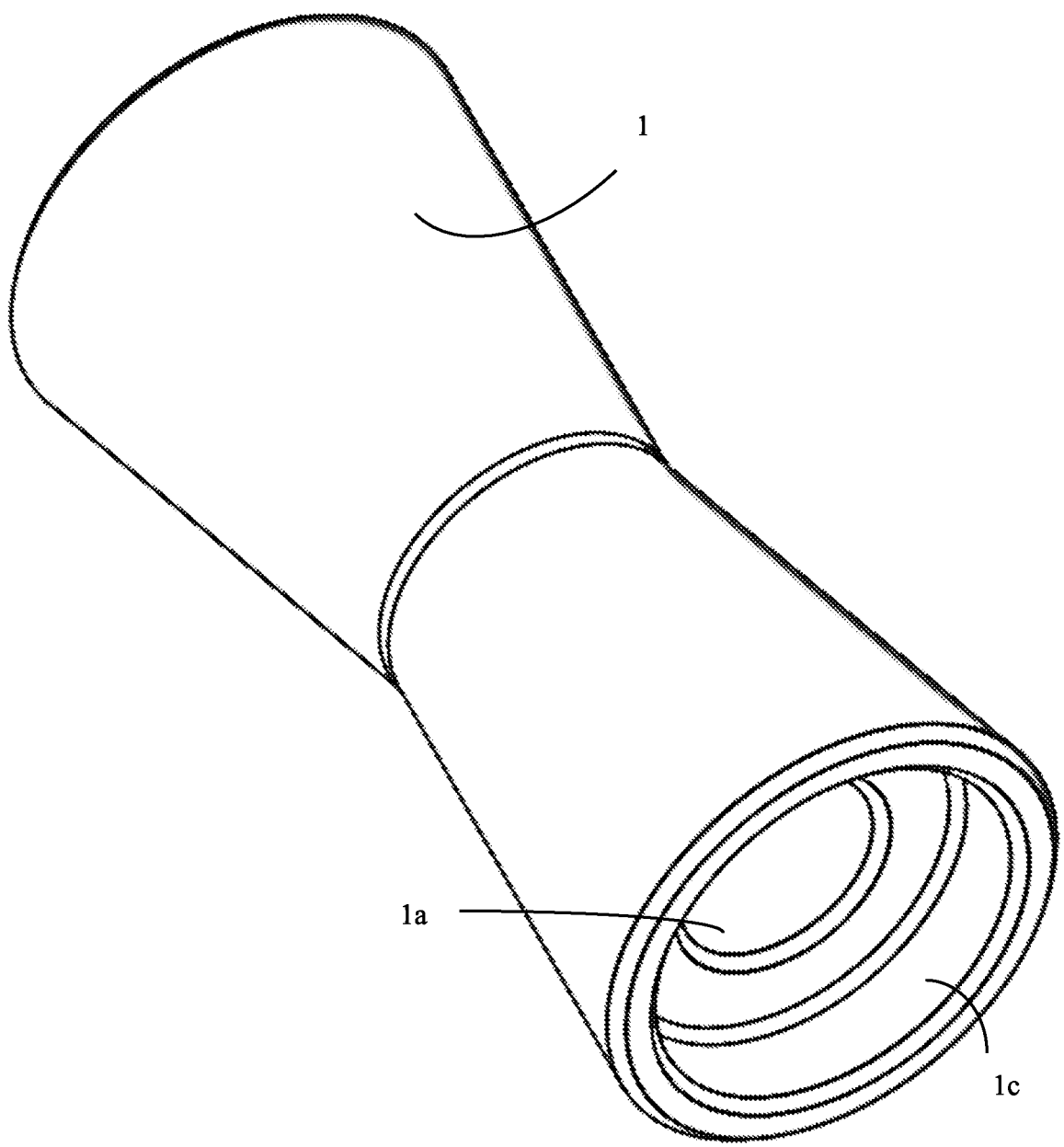
FIG. 3C is a partial perspective view showing the bottom of the roller 1.
Figure 3D:
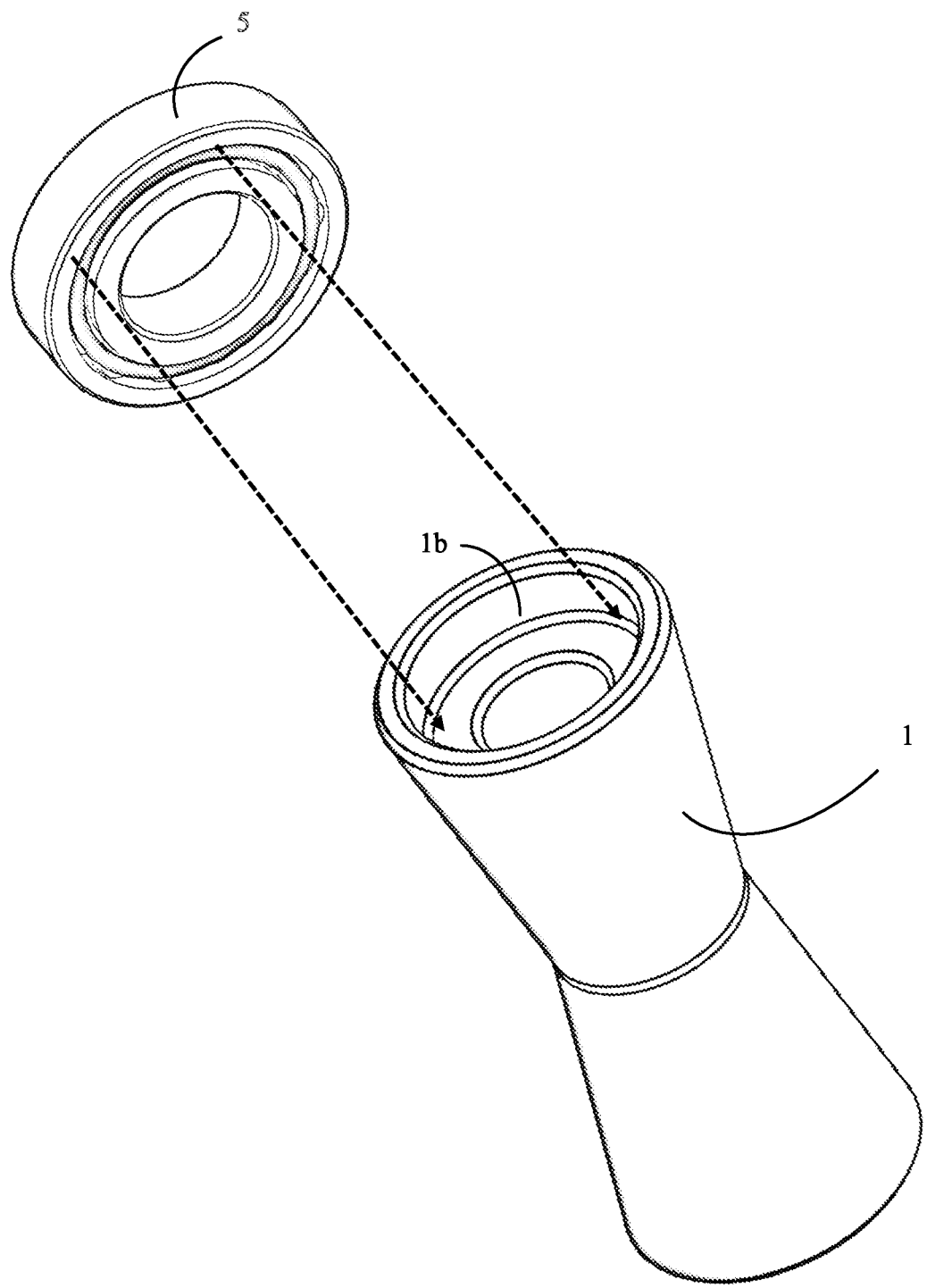
FIG. 3D is a partial perspective view of the roller 1 showing where a roller bearing 5 is placed and seated in an end wall enclosure 1b/1C of the roller 1.
Figure 5:
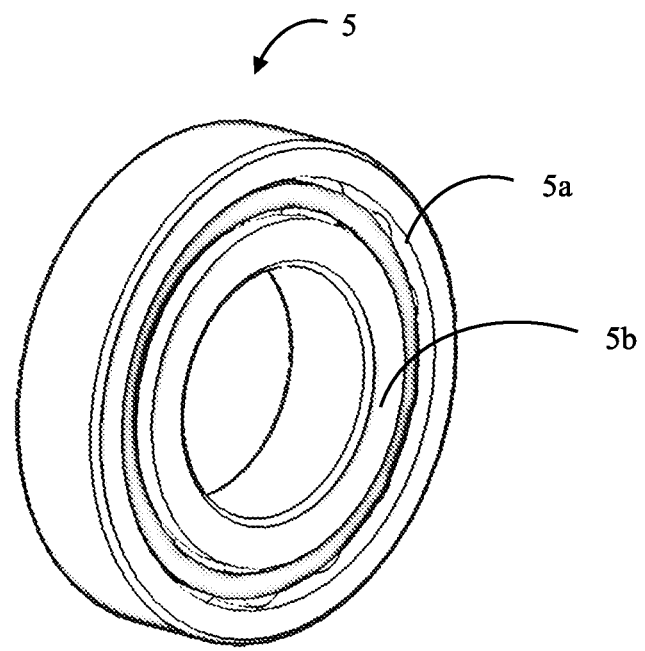
FIG. 5 is a partial side perspective view of the roller bearings 5.
Figure 6:
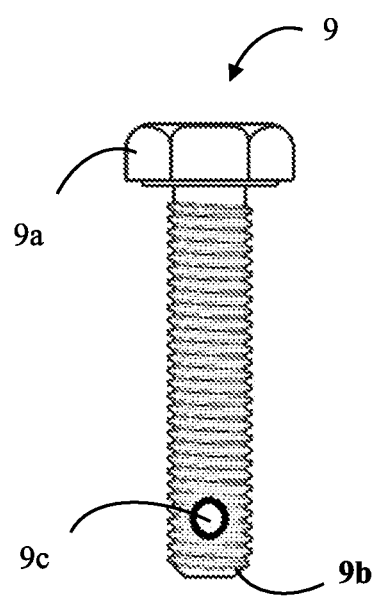
FIG. 6 is a front perspective view of a pole roller bolt 9.
Figure 9:
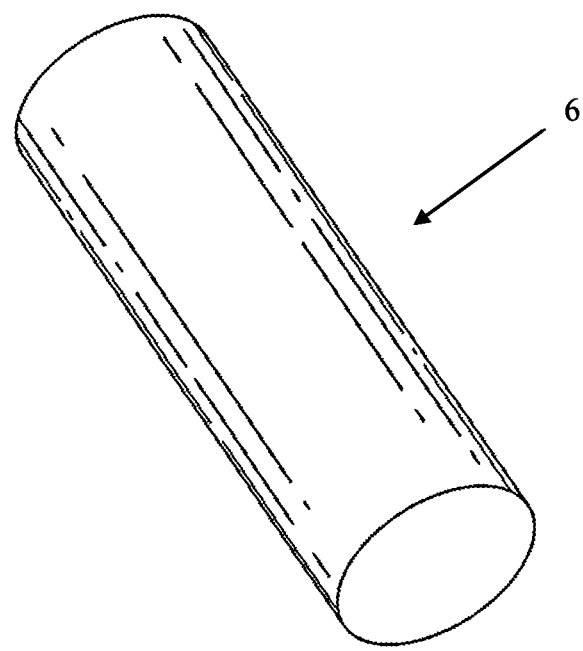
FIG. 9 is a partial perspective view of a pole roller crush sleeve 6.
Figure 10:
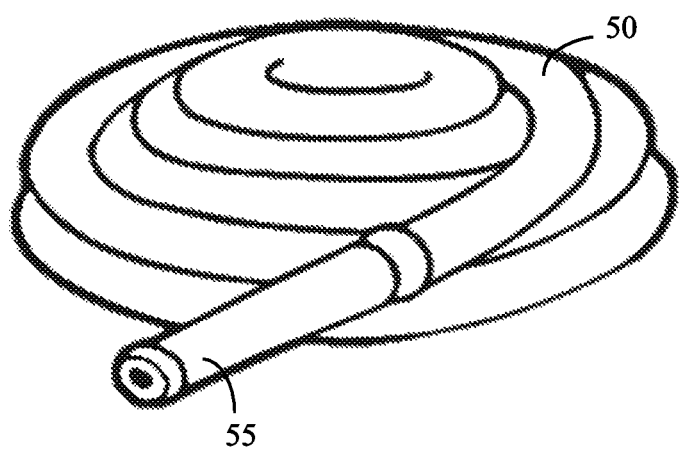
FIG. 10 is a front perspective view of a hose connected to a pressurized nozzle.
Figure 14A:
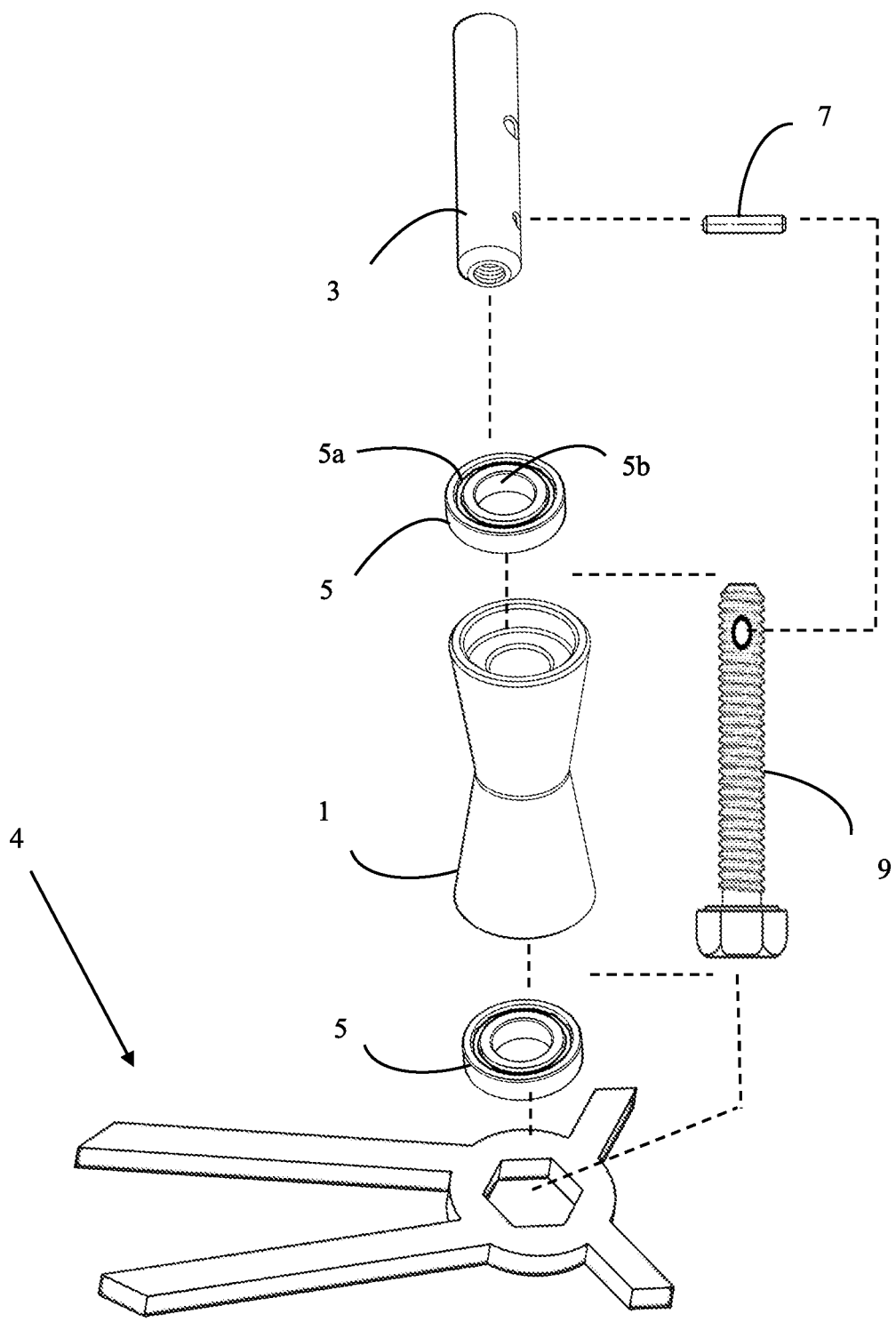
FIGS. 14A-14F are directed to perspective views of the poll roller in FIGS. 1A-1C.
Figure 14B:
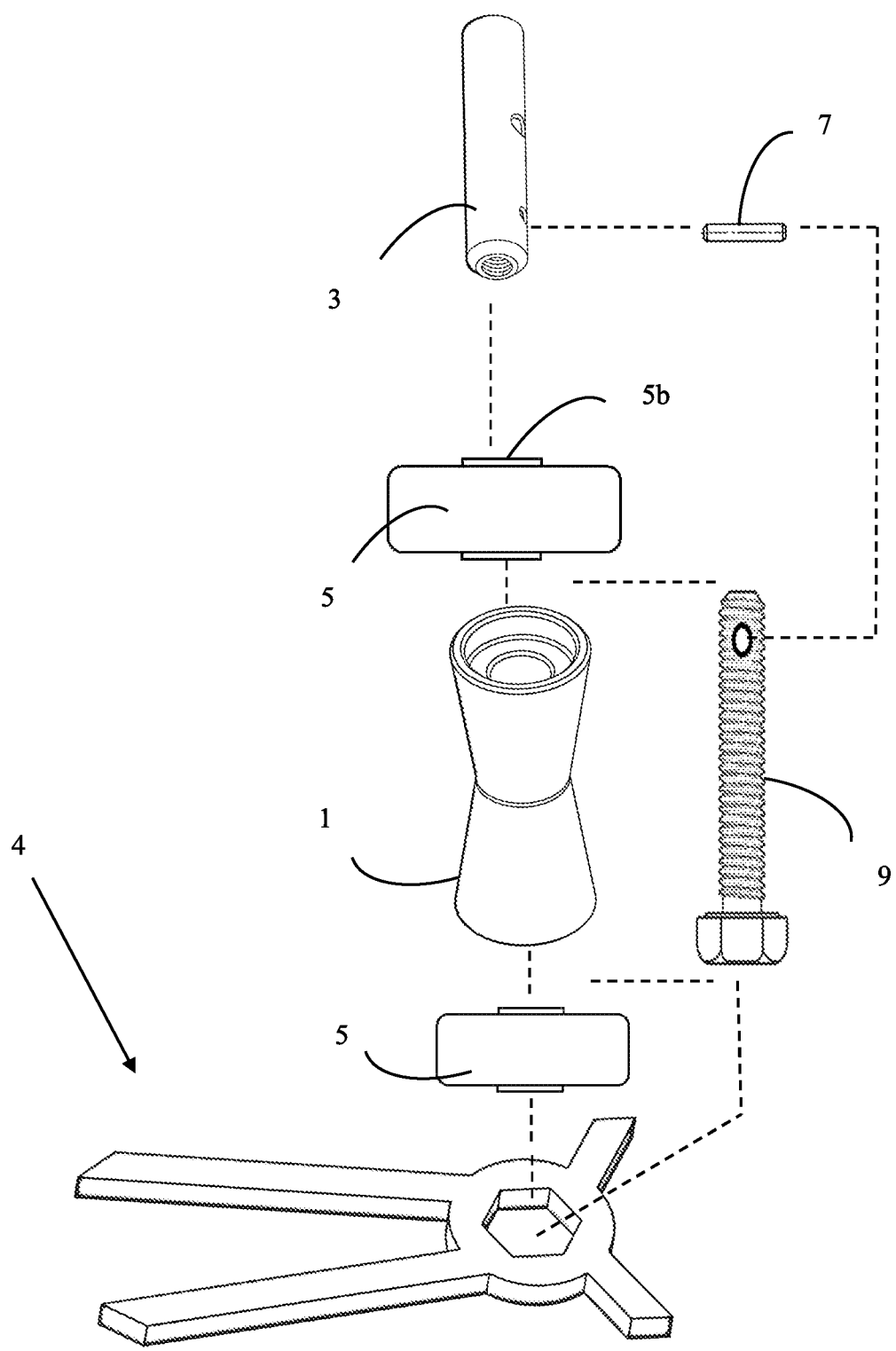
Figure 14C:
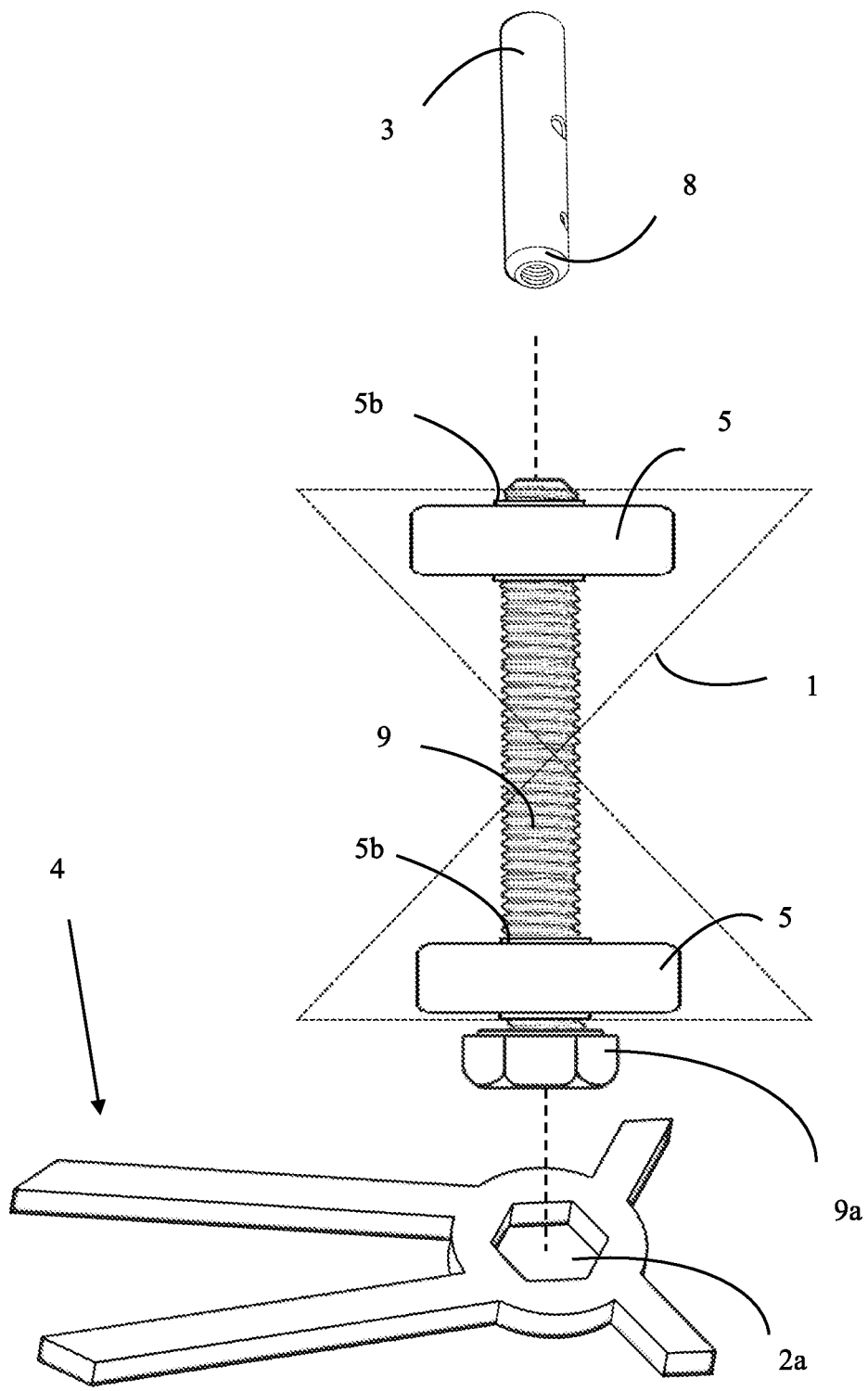
Figure 14D:
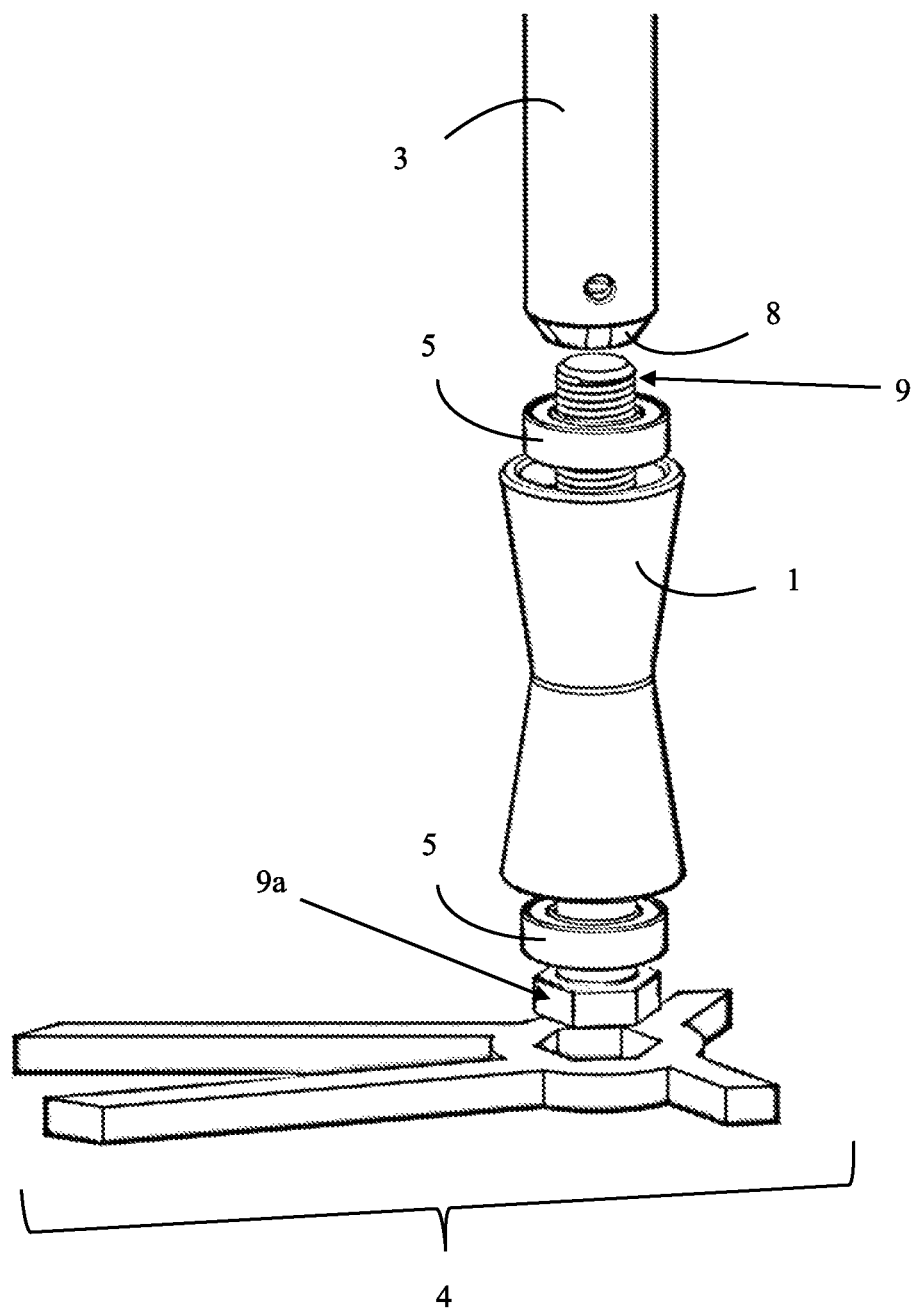
Figure 14E:
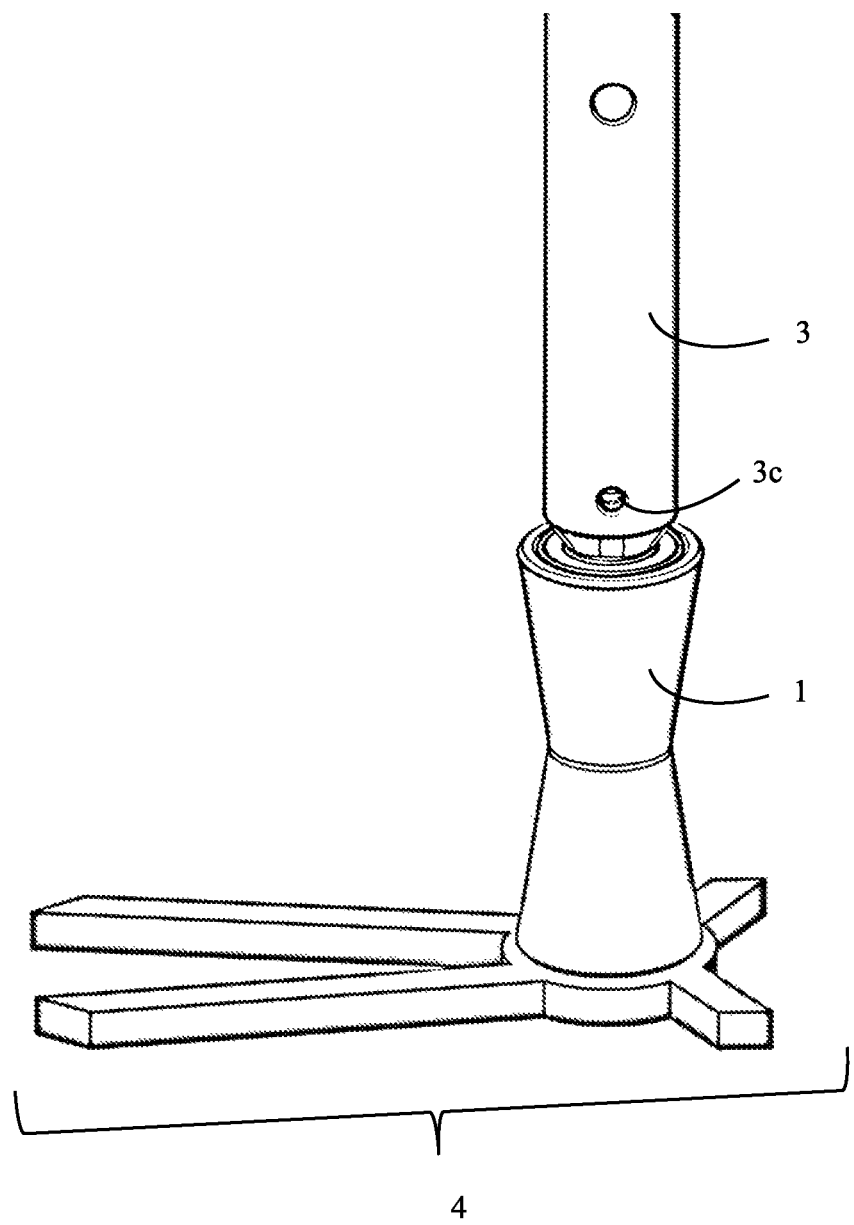

With reference to FIGS. 1A-1C, a pole roller apparatus 100 is shown that includes a roller 1 having an axis, a shaft opening 1a and a pair of opposing end wall enclosures 1b/1c or a pair of end walls 1b/1c (See also FIG. 3B). The pole roller includes a roller having an axis, a shaft opening and a pair of end walls, wherein the end walls include a top and bottom bearing end wall. Said roller, being rotatable about a stationary axle disposed at the axis of the roller. The end wall enclosures include a top bearing end wall enclosure 1b and a bottom bearing end wall enclosure 1c as shown in FIGS. 3A-3C. The shaft opening 1a is configured to house an optional crush sleeve 6 that is disposed between a pair of roller bearings 5 (See also FIGS. 5 & 9). The use of an optional crush sleeve will depend upon the roller manufactured material. In addition, the roller bearings 5 are disposed/housed within the top and bottom end wall enclosures 1b/1c respectively (See FIG. 3D). As shown in FIG. 5, the outer sections 5a of the bearings 5 are configured to rotate with the roller 1 and the inner section 5b of the bearings 5 remain stationary and are fixedly connected to a bolt 9 that acts as an axle (See also FIGS. 14A-14D). The dotted lines shown in FIG. 14C are for illustrative purposes to show how the bearings 5 and the bolt 9 are interconnected within roller 1.

Figure 2:
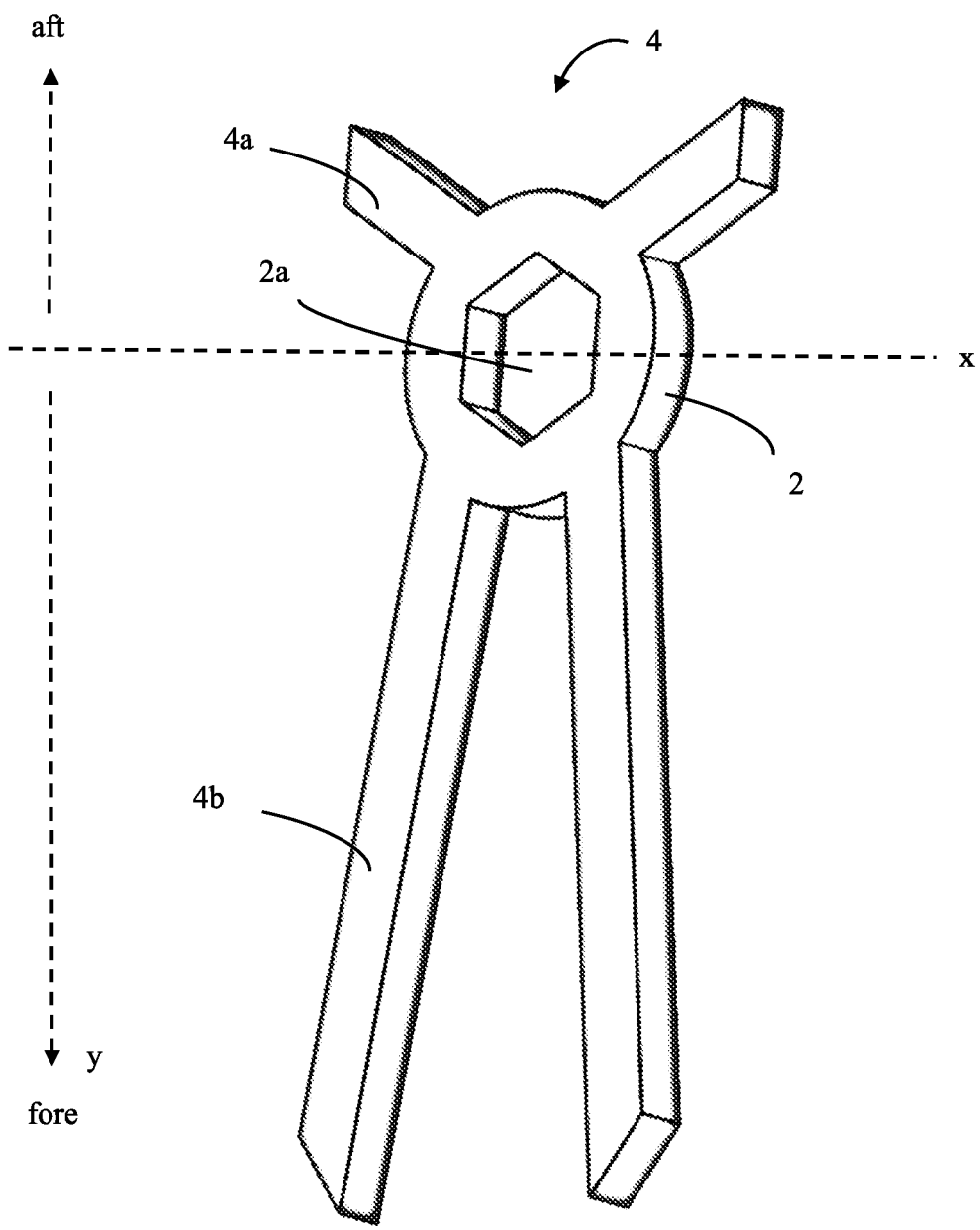
FIG. 2 is a front perspective view of the base 4. The broken lines are for illustrative purposes only and form no part of the claimed invention.
Figure 14F:
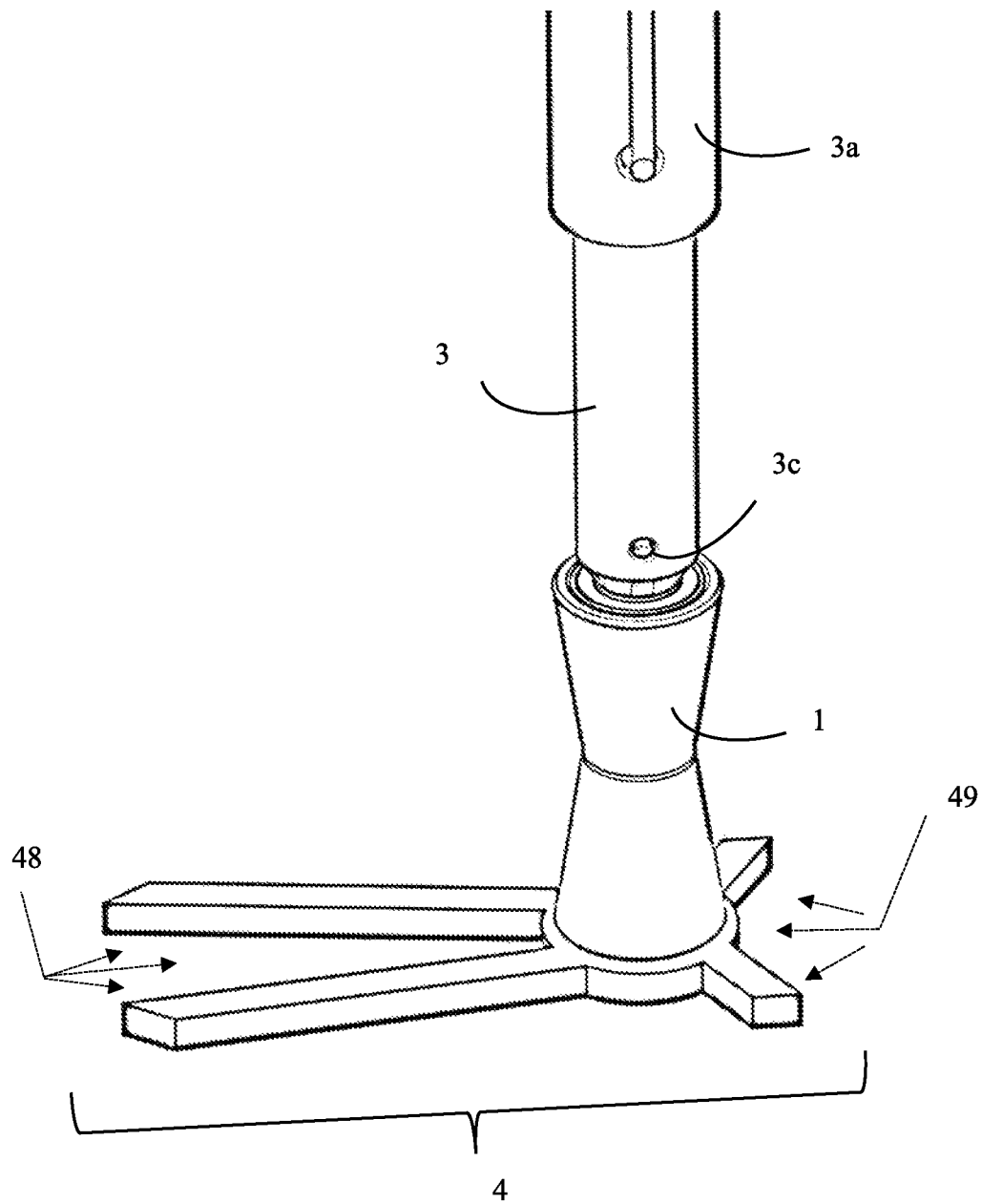

Referring now to FIG. 2, a base frame 4 is configured to include at least one pull-line finger 4b. The base frame 4 also advantageously includes a protection wear ring 2 (See also FIGS. 1A-1B) and a plurality of base support feet 4a. Moreover, the pull-line fingers 4b and the base support feet 4a are fixedly mounted (e.g., welded, bonded, fused, soldered, tied or hinged) to the protection wear ring 2 or configured in one piece. In various embodiments, a plurality of pull-line fingers 4b are comprised of a pair of pull-line fingers 4b having a general V-shape 48 (FIG. 14F) and further illustrated in FIGS. 1A-1C, 2, 14A-14F. In a further embodiment, a plurality of base support feet 4a are comprised of a pair of base support feet 4a having a general V-shape 49 (FIG. 14F) and further illustrated in FIGS. 1B-1C, 2, 14A-14F.

It is envisioned that the base 4 of the present invention may be formed as a single piece of steel, titanium, iron, beryllium, Monel, tungsten, Inconel, or other metallic compounds or in combination with other materials such as wood or composite plastics having acceptable rigidity and strength. Also, the base 4 of the present invention can be formed by a 3-D printer as a single piece or manufactured as a single piece or can be created in separate pieces that are coupled together by bolts, screws, welded together or the like.

Figure 4:
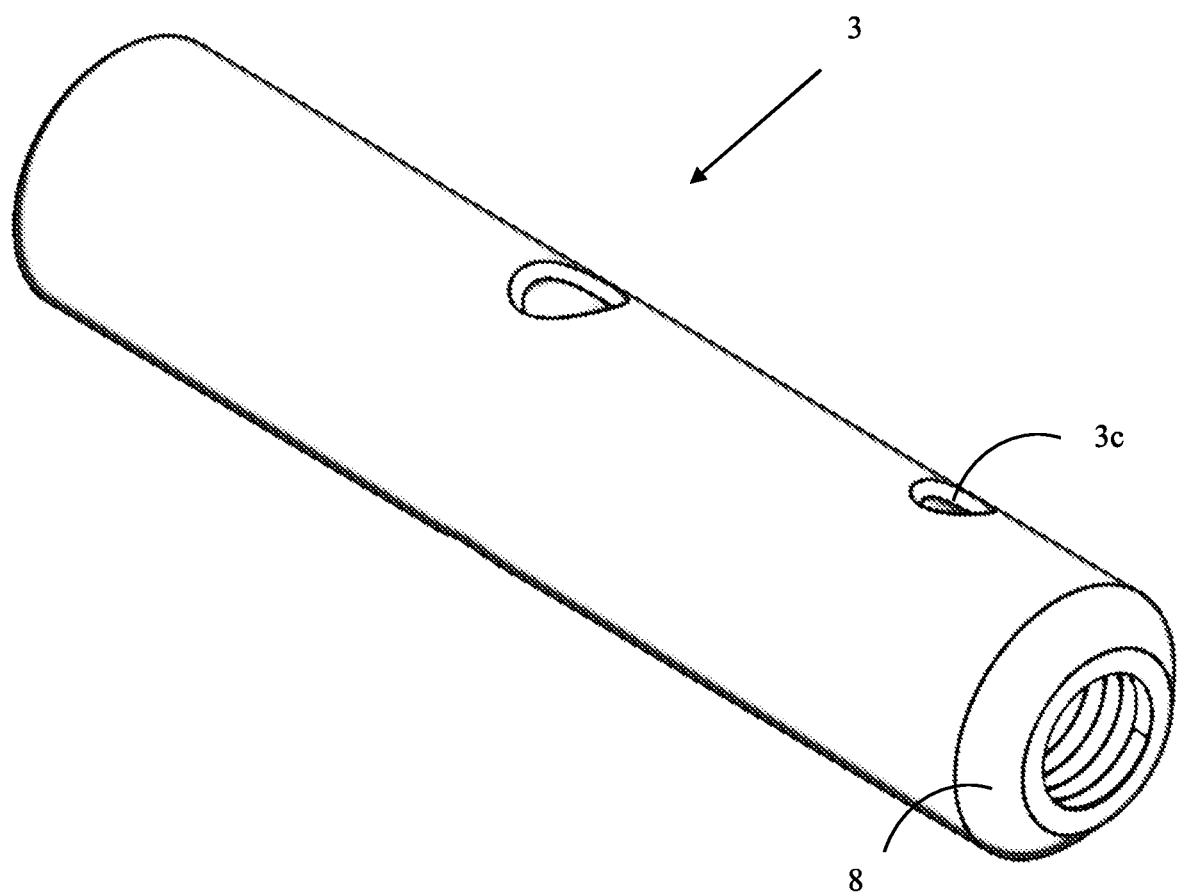
FIG. 4 is a perspective view of the pole attachment member 3.
Figure 7A:
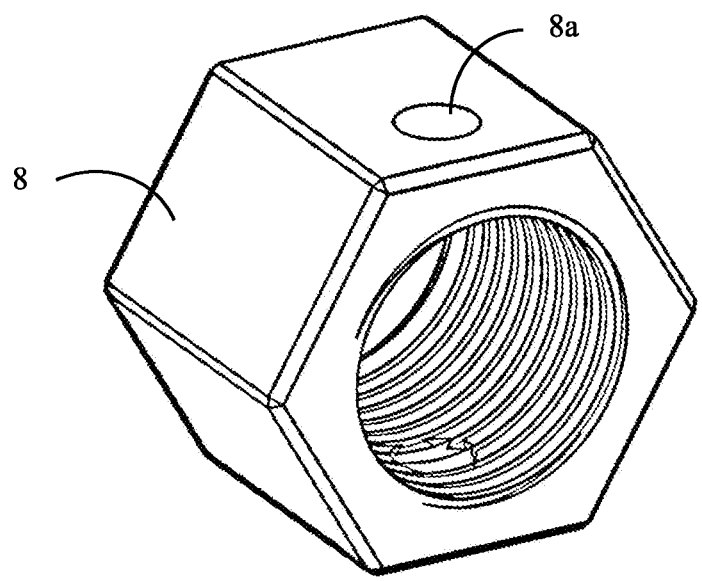
FIG. 7A is a partial perspective view of a pole roller nut 8.
Figure 7B:
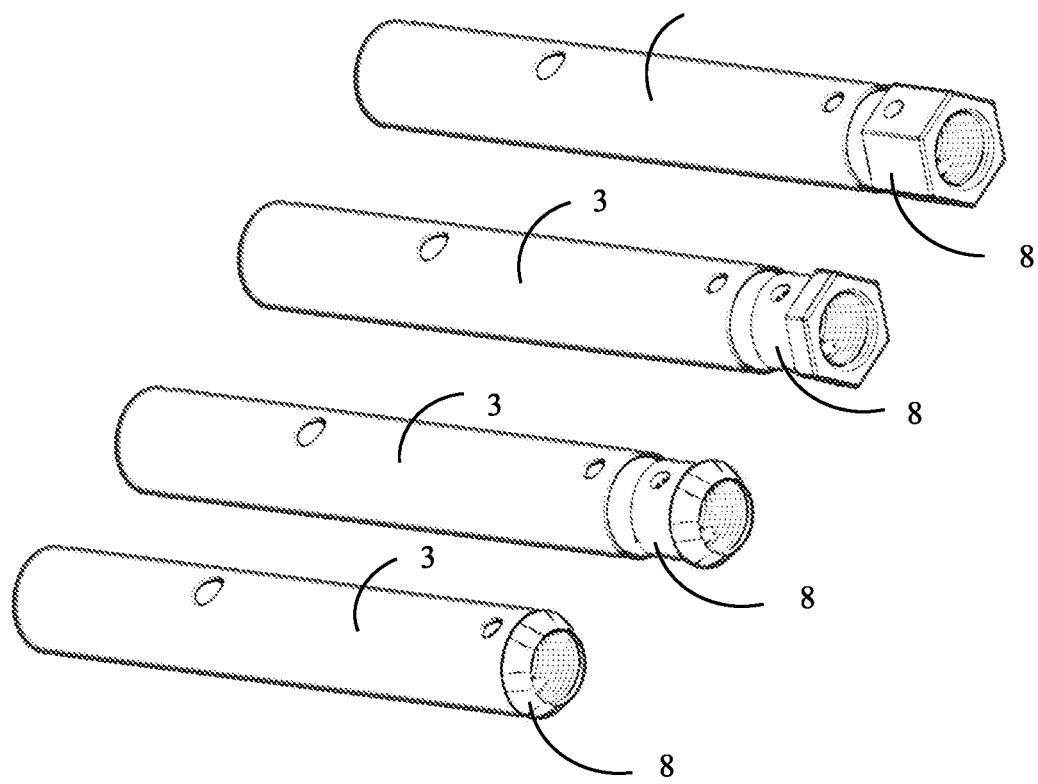
FIG. 7B is a partial perspective view of a pole roller nut 8 in one embodiment being progressively machined and coupled (in four steps) to a pole attachment member 3.
Figure 8:
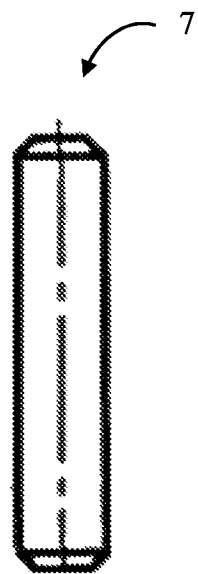
FIG. 8 is affront perspective view of a pole roller pin 7.

Referring to FIGS. 4, 6, and 14A-14F, a pole attachment member 3 having a second pin hole 3c is fixedly mounted/coupled to a bolt 9. The bolt 9 has a head 9a having a hexagon shape and an opposite end 9b having a first pin hole 9c (See FIGS. 6 and 14A-14B). The head 9a is fixedly coupled to an inner connector hole 2a also having a hexagon shape to form the stationary axle (See FIG. 14A-14F) and the pole attachment member 3 is fixedly mounted to the opposite end of the bolt 9b. In the same embodiment, the base frame 4 is configured to rest horizontally on the bottom surface of a pipeline while the roller 1 and pole attachment member 3 are positioned vertical with respect to the base frame 4, thereby enabling the roller 1 to spin while a hose 50 engages thereon when the pole roller 100 is in use. In addition, the pole attachment member 3 remains stationary (i.e., does not spin) while it is attached to an extended pole 3a for allowing a user to hold the pole 3a during use of the pole roller 100. Further, in one embodiment, the pole attachment member 3 includes a nut 8 secured (e.g., welded) to the end of the pole attachment member 3 as shown in FIGS. 4 and 7B. In other embodiments, a pole roller nut 8 includes at least one side pin hole 8a (See FIG. 7A) that is provided to work in cooperation with bolt 9 (See FIG. 14C). In another embodiment, FIG. 7B also shows a progression of a nut 8 being secured to the pole attachment member 3 and machined to have the shape shown therein. In a further embodiment, the pole attachment member 3 can be made in one uniform shape without the need of a nut.

Figure 15:
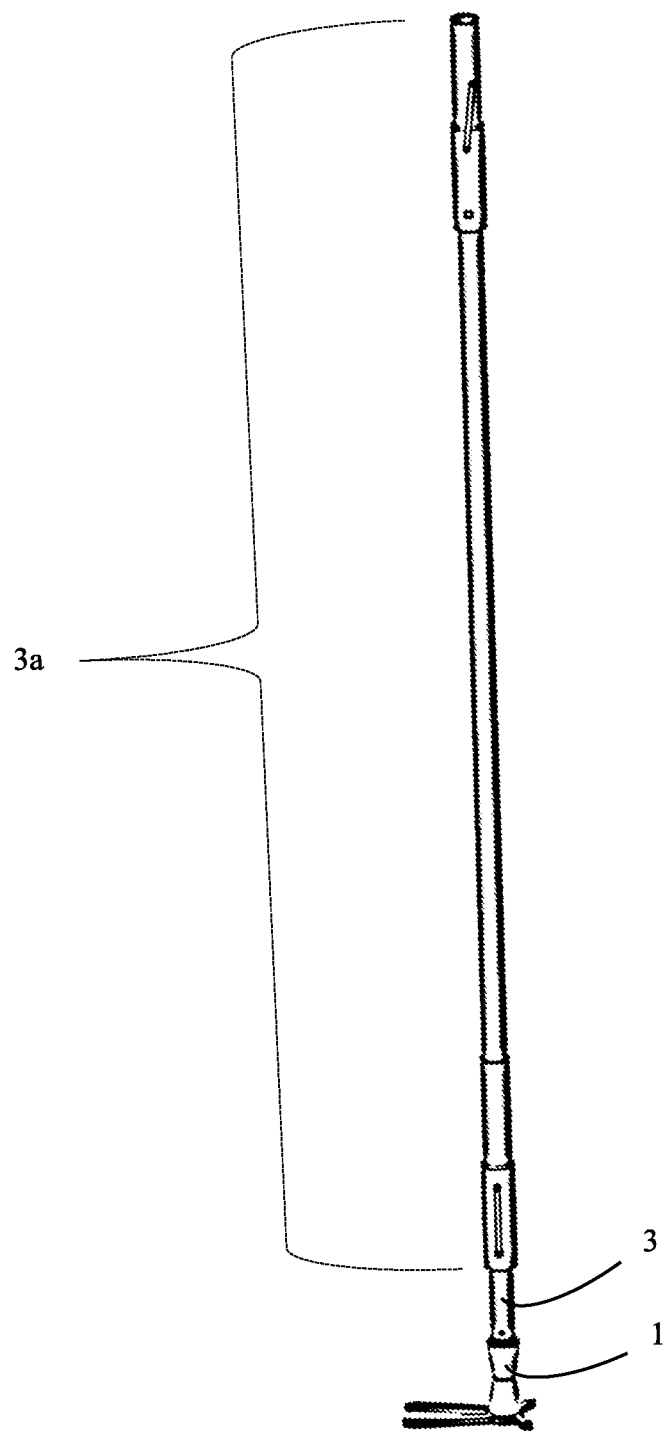
FIG. 15 is a front perspective view of a pole 3a configured to be attached to the pole attachment member 3 of the pole roller 100.

In various embodiments, the pole attachment member 3 of the present invention is fixedly mounted (e.g., screwed on) to the opposite end of the bolt 9b. (See also FIGS. 4-6). In further embodiments, the pole attachment member 3 can be secured to the opposite end of the bolt 9b by placing a pin 7 through the first 9c and second 3c pin holes to securely hinge the pole attachment member 3 to the opposite end of the bolt 9b. Additionally, the pole attachment member 3 remains stationary (i.e., does not spin) and is coupled to an elongated pole 3a to allow a user to hold the elongated pole 3a during use of the pole roller 100 as shown in FIG. 15. The rotational spin of the roller 1 is controlled by the connecting tension points created between the pole attachment member 3 and the end of the bolt 9b. A user can adjust the connecting tension points between the pole attachment member 3 and the end bolt 9b until these connecting points are secure and the roller 3 rotates freely. After the user is satisfied with the connecting tension points, a pin 7 can be secured to the pin hole 9c of the bolt 9.

Figure 13A:
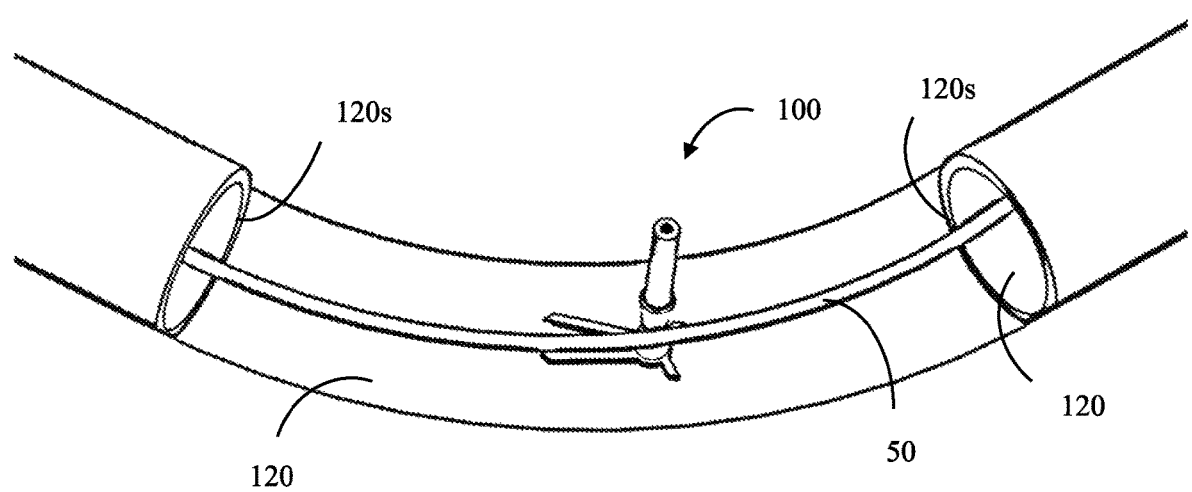
FIGS. 13A, 13B and 13D are directed to pole roller 100 being used in manhole or pipeline or an obstacle (See FIG. 13C) such as a building, tree, fence, etc.
Figure 13B:
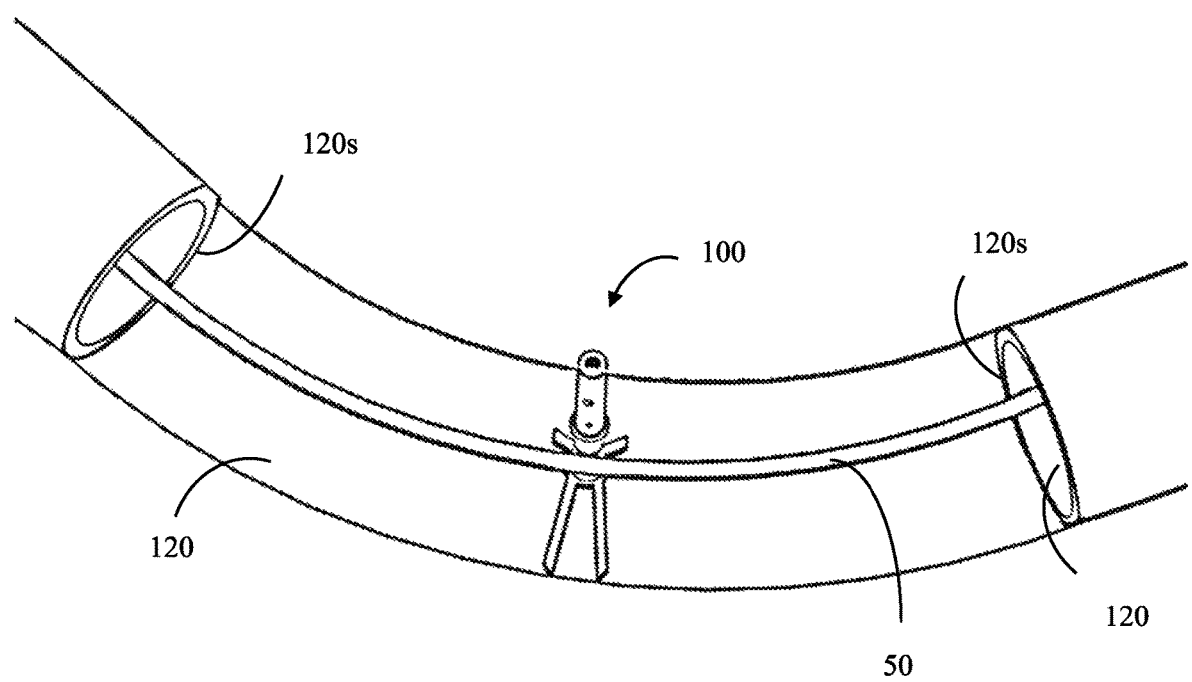
Figure 13C:
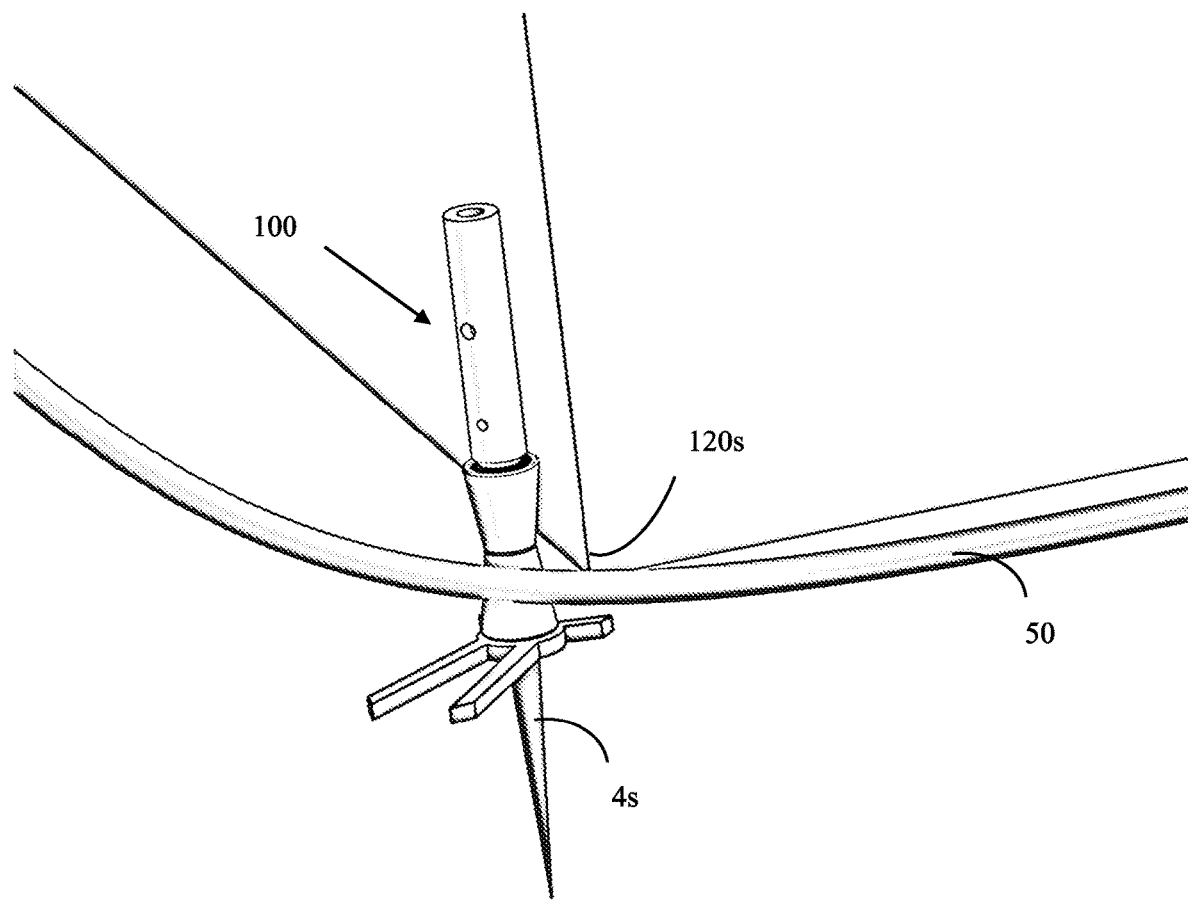
Figure 13D:
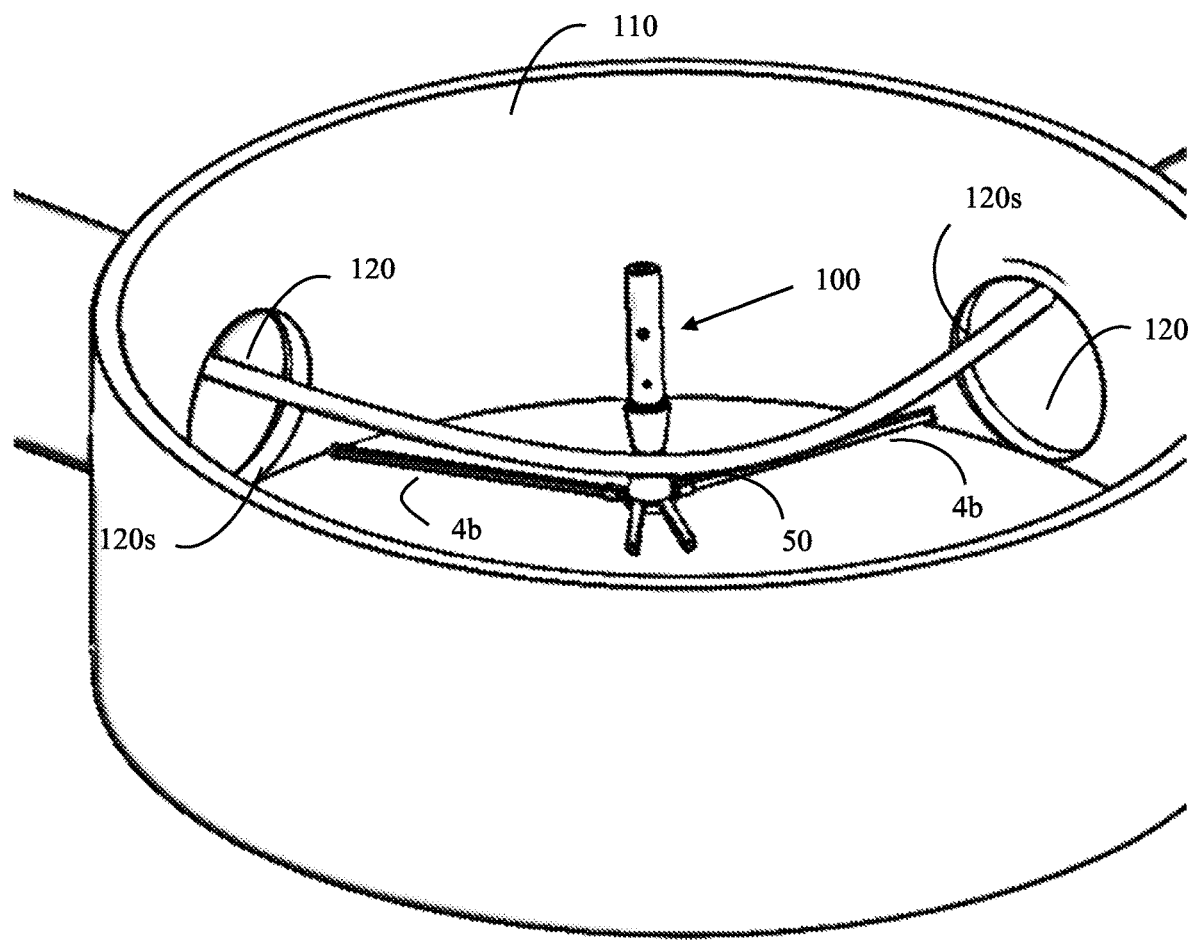

In use, the base frame 4 is suitably configured to rest horizontally on the bottom surface of a pipeline 120 while the roller 1 and pole attachment member 3 are all positioned vertical with respect to the base frame 4, thereby enabling the roller 1 to freely spin when engaged by a hose (See also FIGS. 13A, 13B and 13D).

Figure 11:
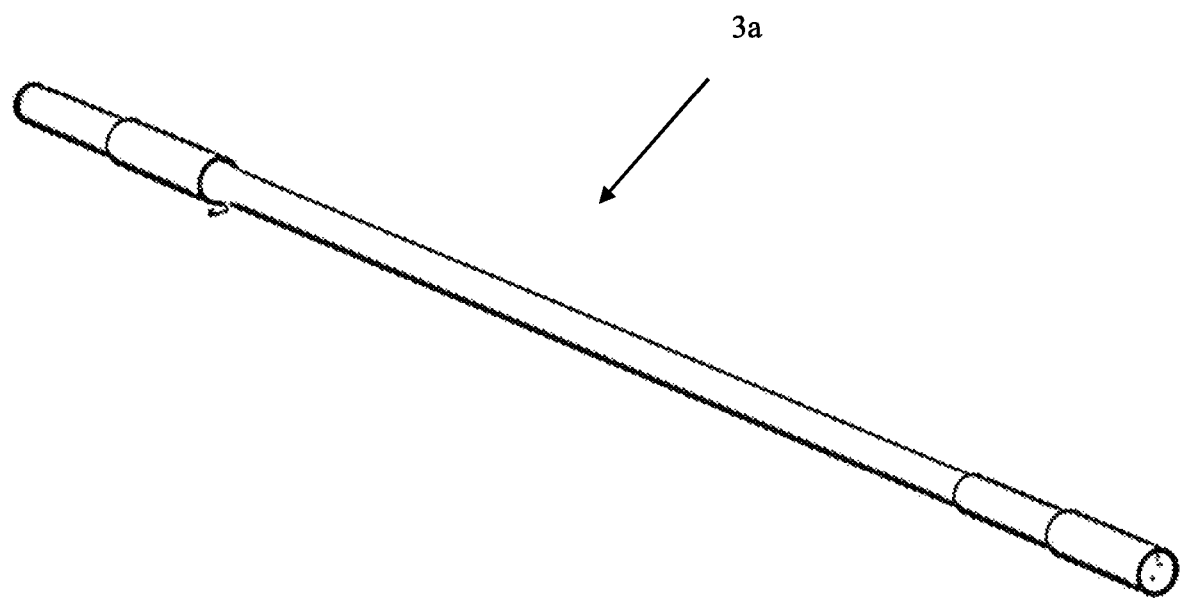
FIG. 11 is a front perspective view of a pole 3a configured to be attached to the pole attachment member 3.

In various embodiments, the pole attachment member 3 can be mounted in place by a tight interference fit and then securely hinged in place by the pin 7. Also, the pole attachment member 3 is configured to allow an elongated pole 3a to be attached thereon for allowing a user or operator to place the pole roller 100 in an access hole 110 (See FIGS. 11 and 15). Optionally, the head 9a of the bolt 9 can be fixedly coupled/secured to the inner connector hole 2a that has a hexagon shape by various means such as being welded, bonded, fused, soldered, tied, hinged, screwed, clipped, riveted or pinned to the inner connector hole 2a.

In operation, the pole roller 100 of the present invention is placed in an access hole such as a sewer access hole 110, commonly referred to as a manhole 110. Once the pole roller 100 is placed in the manhole 110 via the elongated pole 3a, a user or operator will then use the pull-line fingers 4b to lift and then place a hose 50 and nozzle 55 in the sewer pipeline 120 channel that veers off at an angle (See also FIGS. 13A, 13B and 13D). The base frame 4 of the pole roller 100 is suitably configured to rest horizontally on the bottom surface of the pipeline 120. Further, the pole attachment member 3, the elongated pole 3a and roller 1 are positioned vertical with respect to the base frame 4. The base support feet 4a are suitably configured to stabilize the pole roller apparatus 100 as it rests against the bottom and/or side surface of a sewer pipeline 120. Similarly, the support feet 4a are also configured to dig or poke into both the bottom and side surface of the sewer pipeline 120 for additional support.

If the roller 1 contacts a side surface of the pipeline 120 during use, the friction could inhibit the free rotation of roller 1 and eliminate the effectiveness of the roller apparatus 100. Similarly, friction between roller 1 and a side surface of the pipeline 120 can cause damage to the roller 1 and necessitate a shortened lifespan of the roller apparatus 1. Further, a hose 50 could wear out faster if a pole roller 100 is not used while the hose 50 is moving forward in a sewer pipeline 120 or pipeline 120 while traversing on the bottom surface of a pipeline 120 that veers off at an angle. As this angle increases, the surface friction and/or drag also increases which causes the hose to wear down faster. Hence, the protection wear ring 2 advantageously helps to eliminate these problems.

In use, pull-line fingers 4b and the base support feet 4a can be braced against a side wall of the pipe to prevent the roller 1 from coming into contact with said side wall as shown in FIGS. 13A, 13B and 13D. However, intersections in the pipeline can vary in size and degree and are often structured in such a way that fingers 4b and the base support feet 4a cannot properly brace roller 1 from the side surfaces. Accordingly, protection wear ring 2 of the present invention is included as a catch-all brace (See FIGS. 1A-1B and 2). Protection wear ring 2 is sized such that an outer radius of the ring 2 is larger than the radius of roller 1. Protection wear ring 2 is also placed in close proximity to roller 100 in order to prevent the roller 100 from contacting any part of a side surface point of entry 120s of the pipeline 120 or an obstacle.

Figure 12A:
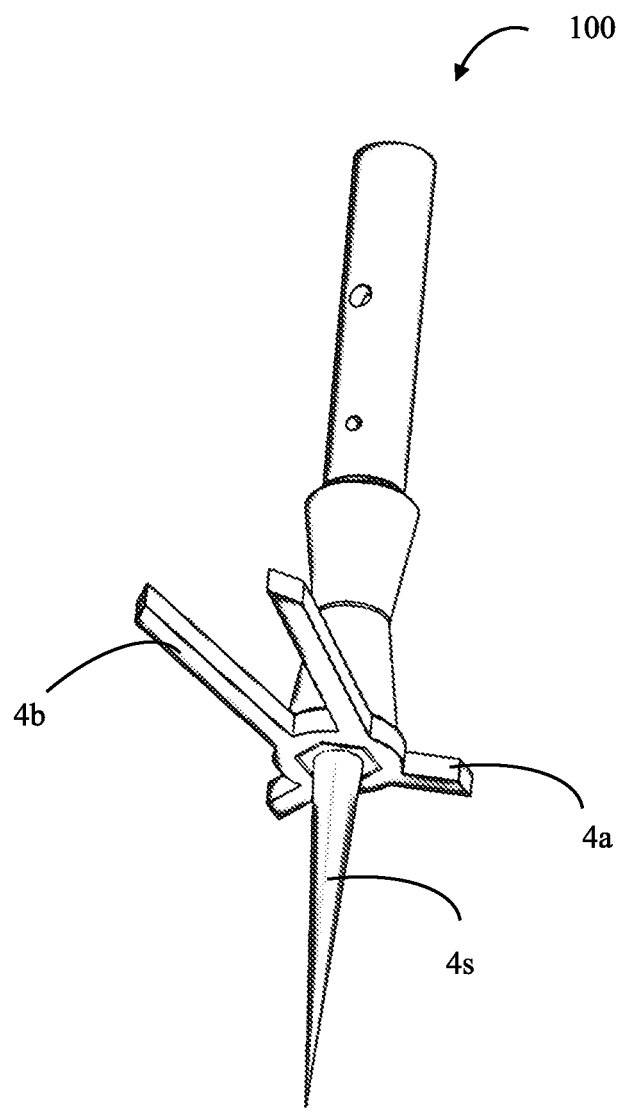
FIGS. 12A-12D are directed to alternative embodiments of FIGS. 1A-1C.
Figure 12B:
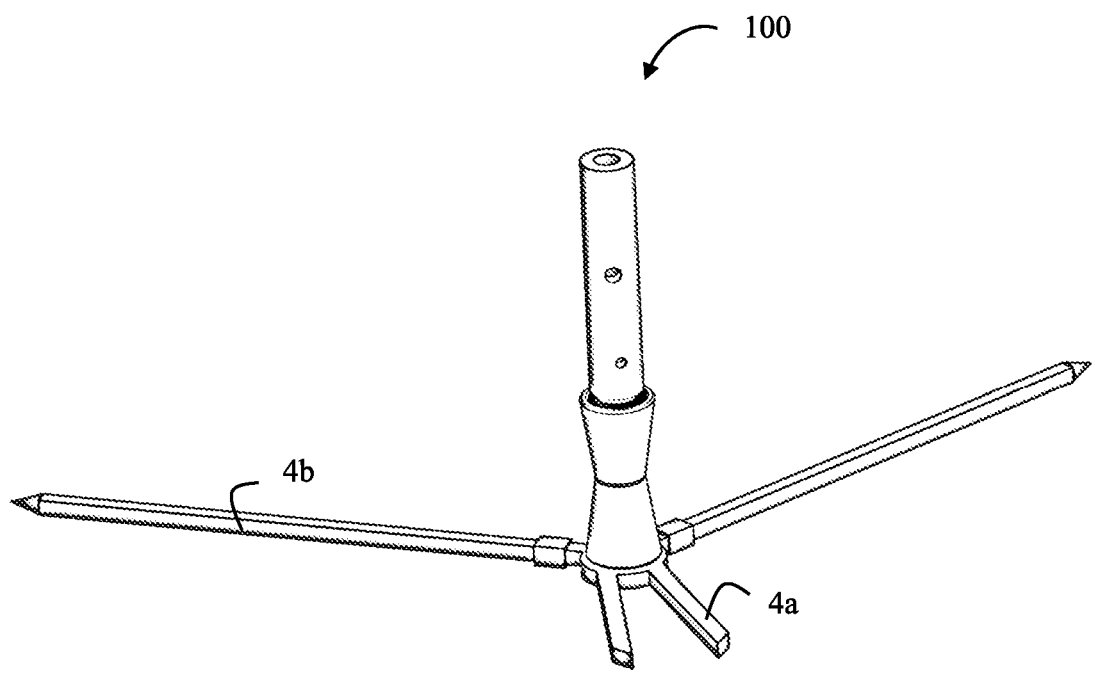
Figure 12C:
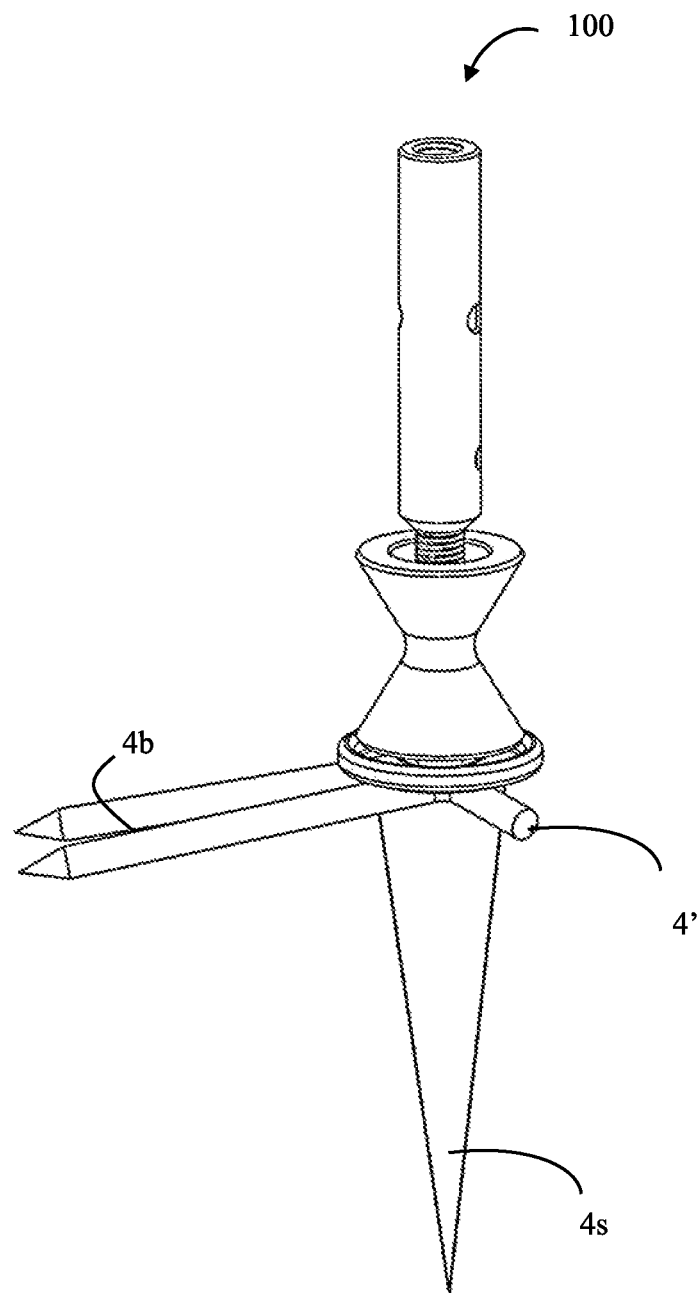
Figure 12D:
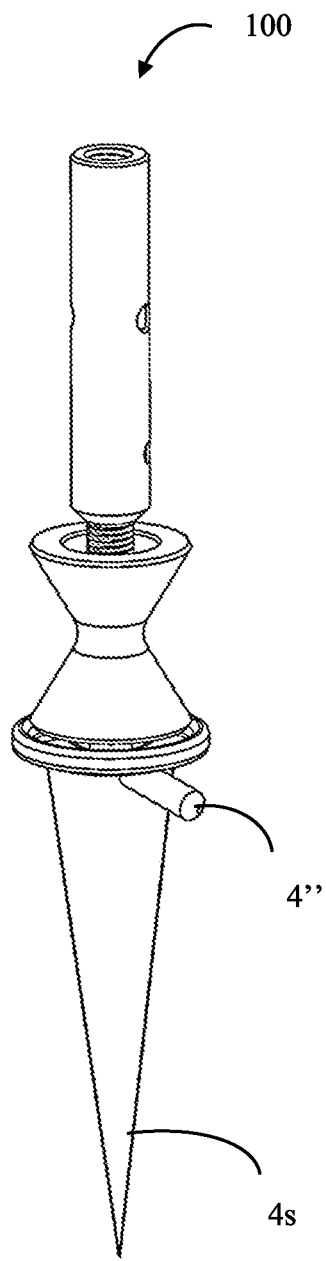

With reference to FIGS. 12A-12D, alternative embodiments of the present invention are shown for also carrying out the intent of the present invention. In one embodiment, the pole roller 100 advantageously includes a ground spike 4s which is coupled to the bottom of the pole roller 100 as shown in FIGS. 12A, 12C and 12D. Optionally, the ground spike 4s includes threads for allowing said spike 4s to be threaded to the bottom of the pole roller 100.

In use, the ground spike 4s is shoved or driven into the ground (i.e., dirt or gravel surface) for allowing the base frame 4'/4" of the pole roller 100 to rest horizontally on the bottom surface of a pipeline 120 as shown in FIG. 13C, or to keep a hose 50 from being damaged on the apex of an obstacle such as a building, fence, tree, etc. that veers off at an angle. Similarly, the pole roller 100 could include support feet 4a and pull-line fingers 4b as shown in FIGS. 12A and 12C. Further, the ground spike 4s can be comprised of various sizes such as being fat, skinny, long, or short while be used to carry out various embodiments of the present invention.

Optionally, the pull-line fingers 4b in one embodiment can include extended pull-line fingers 4b which provide the benefit of less resistance when transferring and turning a hose 50 from one pipeline into another pipeline in a manhole with a flat bottom (See FIG. 13D). With respect to a customary manhole 110, one with the channel clearly cut or formed, there is an inside to the turn that the pole roller 100 rests against to help keep the hose 50 off of for smooth rolling to eliminate resistance. In the case where the manhole 110 is made to have a flat bottom, as in no formed or cut channel with an inside radius for the roller 100 to brace against, the extensions 4b as shown in FIG. 13D rest on the manhole walls to allow the roller 100 to still be positioned roughly in the center of the manhole 110 so that when the hose 50 comes in from one pipe 120, it doesn't rub against the pipe edge. Likewise, when leaving the manhole 110, the hose 50 goes straight into the exiting pipe 120 and does not rub against that pipe edge either. With the strong force against anything in contact with the hose 50 on the turn, the two points at the edges of the pipe 120, without the roller 100 having extensions to keep the hose 50 in the optimum position, would have severe resistance along those contact points and would likely tear the hose liner causing damage to the hose 50.

It should be pointed out that, while the pole roller apparatus 100 is being described for use in assisting a sewer hose and a pressurized nozzle to advance forward in sewer pipelines that veer off at various angles, the invention need not be limited to this particular application. The device or apparatus could be used and/or configured for assisting hoses or lines to advance forward in other applications as well. For example, such as pole roller apparatus could be used in firefighting applications or even flood control situations where hoses or lines have to advance forward in various types of pipelines that veer off at various angles. Further, the pole roller apparatus could be used by cable and wire lineman for cable and wire pulling (e.g., a power rodder is used in these industries for pulling wire from one end of the conduit to the other end). In essence, these industries also have manholes and pipes, referred to as conduits, and may have pipelines that veer off at various angles.

It should be understood that the foregoing relates to various embodiments of the invention and that modifications may be made without departing from the spirit and scope of the invention. It should also be understood that the present invention is not limited to the designs mentioned in this application and the equivalent designs in this description, but it is also intended to cover other equivalents now known to those skilled in the art, or those equivalents which may become known to those skilled in the art in the future.

What is claimed is:

1. A pole roller comprising:
   a roller having an axis, wherein the roller further has a circular shaft opening, and circular top and bottom end wall enclosures configured to securely house a pair of roller bearings respectively;
   a base frame comprised of a plurality of pull-line fingers, a protection wear ring and a plurality of base support feet, wherein the plurality of fingers are coupled to an outer radius of the protection wear ring and the plurality of base support feet are coupled to the outer radius of the protection wear ring, wherein the pull-line fingers are longer in length than the base support feet, the pull-line fingers configured to lift and manipulate a position of a hose;
   the roller, being rotatable about an axle disposed at the axis of the roller, configured to function in cooperation with the hose, said roller having the axis generally positioned orthogonal to the base frame, wherein the axle is comprised of a bolt having a head and an opposite end;
   the protection wear ring further includes an inner connector hole disposed within the outer radius of said protection wear ring, the protection wear ring configured to prevent the roller and the hose from contacting a surface point or other obstacle along a pathway of the hose during use; and
   a pole attachment member, coupled to the opposite end of the bolt in axial alignment, and the head of the bolt fixedly connected to the inner connector hole.

2. The pole roller according to claim 1, wherein the pole attachment member includes a second pin hole.

3. The pole roller according to claim 2, wherein the opposite end of the bolt includes a first pin hole, and wherein the pole attachment member is secured to the opposite end of the bolt by placing a pin through the first and second pin holes to securely hinge the pole attachment member to the opposite end of the bolt.

4. The pole roller according to claim 3, wherein an elongated pole is coupled to the pole attachment member.

5. The pole roller according to claim 1, wherein a radius of the top and bottom end wall enclosures is equal, and a radius of the circular shaft opening is smaller than the radius of the top and bottom end wall enclosures.

6. The pole roller according to claim 1, wherein each of the circular end wall enclosures has an outer radius smaller than the outer radius of the protection wear ring.

7. The pole roller according to claim 1, wherein the shape of the head is comprised of a hexagon shape, and wherein the shape of the inner connector hole is also comprised of a hexagon shape for receiving the head of the bolt.

8. The pole roller according to claim 1, wherein the plurality of base support feet and the plurality of pull-line fingers are disposed substantially on opposite sides of the protection wear ring.

9. The pole roller according to claim 8, wherein the plurality of pull-line fingers are comprised of a pair of pull-line fingers having a general V-shape, and wherein the plurality of base support feet are comprised of a pair of base support feet also having a general V-shape.

10. The pole roller according to claim 1, wherein each of the roller bearings have an inner section and an outer section, wherein the outer section of each bearing is configured to rotate in cooperation with the roller, and the inner section of each bearing is configured to be stationary and fixedly coupled to the bolt to form a stationary axle.

11. The pole roller according to claim 1, wherein a shape of the roller is comprised substantially of two opposing frustums, each of the frustums having a smaller diameter end, and wherein the two opposing frustums are connected to each other at the smaller diameter end.

12. A pole roller system configured to prevent a hose from contacting a side surface point of entry in a pipeline, said system comprising:
   a hose coupled to a nozzle;
   a roller having an axis, wherein the roller further has a circular shaft opening, and circular top and bottom end wall enclosures configured to securely house a pair of roller bearings respectively;
   a base frame comprised of a plurality of pull-line fingers, a protection wear ring and a plurality of base support feet, wherein the plurality of pull-line fingers are coupled to an outer radius of the protection wear ring and the plurality of base support feet are coupled to the outer radius of the protection wear ring, wherein the pull-line fingers are longer in length than the base support feet, the pull-line fingers configured to lift and manipulate a position of the hose;
   the roller, being rotatable about an axle disposed at the axis of the roller, configured to function in cooperation with the hose, said roller having the axis generally positioned orthogonal to the base frame, wherein the axle is comprised of a bolt having a head and an opposite end;
   the protection wear ring further includes an inner connector hole disposed within the outer radius of said protection wear ring, the protection wear ring configured to prevent the roller and the hose from contacting a surface point or other obstacle along a pathway of the hose during use; and a pole attachment member, coupled to the opposite end of the bolt in axial alignment, and the head of the bolt fixedly connected to the inner connector hole.

13. The pole roller system according to claim 12, wherein the hose is a sewer hose.

14. The pole roller system according to claim 13, wherein the nozzle is a high-pressure nozzle.

15. The pole roller system according to claim 12, wherein the base frame further includes a ground spike.

16. The pole roller system according to claim 12, wherein a shape of the roller is comprised substantially of two opposing frustums, each of the frustums having a smaller diameter end, and wherein the two opposing frustums are connected to each other at the smaller diameter end.

17. The pole roller system according to claim 14, wherein a water pressure generated by the high-pressure nozzle is in the range of 500 psi to 4,000 psi.

18. The pole roller system according to claim 12, wherein the plurality of base support feet and the plurality of pull-line fingers are disposed substantially on opposite sides of the protection wear ring.

19. The pole roller according to claim 18, wherein the plurality of pull-line fingers are comprised of a pair of pull-line fingers having a general V-shape, and wherein the plurality of base support feet are comprised of a pair of base support feet also having a general V-shape.

20. The pole roller according to claim 12, wherein an elongated pole is coupled to the pole attachment member.

* * * * *